US012038958B1

(12) United States Patent
Soubbotin

(10) Patent No.: US 12,038,958 B1
(45) Date of Patent: *Jul. 16, 2024

(54) SYSTEM, METHOD, AND USER INTERFACE FOR A SEARCH ENGINE BASED ON MULTI-DOCUMENT SUMMARIZATION

(71) Applicant: Dmitri Soubbotin, Brooklyn, NY (US)

(72) Inventor: Dmitri Soubbotin, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,204

(22) Filed: Apr. 14, 2023

Related U.S. Application Data

(63) Continuation-in-part of application No. 17/008,322, filed on Aug. 31, 2020, now Pat. No. 11,651,039, which is a continuation-in-part of application No. 14/960,213, filed on Dec. 4, 2015, now Pat. No. 10,783,192, which is a continuation-in-part of application No. 13/539,098, filed on Jun. 29, 2012, now Pat. No. 9,218,414, which is a continuation-in-part of application No. 12/023,014, filed on Jan. 30, 2008, now Pat. No. 8,239,358.

(60) Provisional application No. 60/888,515, filed on Feb. 6, 2007.

(51) Int. Cl.
*G06F 17/00* (2019.01)
*G06F 7/00* (2006.01)
*G06F 16/335* (2019.01)
*G06F 16/34* (2019.01)
*G06F 16/954* (2019.01)
*G06F 16/955* (2019.01)

(52) U.S. Cl.
CPC .......... *G06F 16/345* (2019.01); *G06F 16/335* (2019.01); *G06F 16/954* (2019.01); *G06F 16/9558* (2019.01)

(58) Field of Classification Search
CPC .. G06F 16/345; G06F 16/9558; G06F 16/335; G06F 16/954
USPC .................................................. 707/707, 706
See application file for complete search history.

(56) References Cited

U.S. PATENT DOCUMENTS

| | | | | |
|---|---|---|---|---|
| 5,623,652 A | * | 4/1997 | Vora | G06F 16/332 707/E17.061 |
| 6,944,612 B2 | * | 9/2005 | Roustant | G06F 16/9535 715/275 |
| 2005/0203970 A1 | * | 9/2005 | McKeown | G06Q 10/10 707/999.203 |
| 2017/0068683 A1 | * | 3/2017 | Bakshi | G06F 16/9535 |

* cited by examiner

*Primary Examiner* — Pavan Mamillapalli
(74) *Attorney, Agent, or Firm* — Ariel S. Bentolila; Bay Area IP Group, LLC

(57) ABSTRACT

A system and methods are provided for achieving multi-document summarization according to the present invention, which sets forth the integrating of multi-document summary into a search result of a search engine, or any other application where the system receives a user natural language/keyword query and generates coherent summarized response(s) based on parts of one or more corresponding source documents.

23 Claims, 17 Drawing Sheets

SYSTEM, METHOD, AND USER INTERFACE FOR A SEARCH ENGINE BASED ON MULTI-DOCUMENT SUMMARIZATION

CROSS-REFERENCE TO RELATED APPLICATIONS

The present continuation-in-part patent application claims priority benefit of U.S. patent application Ser. No. 17/008,322 filed on 31 Aug. 2020, U.S. patent application Ser. No. 14/960,213 filed on 4 Dec. 2015, U.S. patent application Ser. No. 13/539,098 filed on 29 Jun. 2012, and U.S. patent application Ser. No. 12/023,014 filed on 30 Jan. 2008 all of which are filed under 35 USC 111(a) and are entitled "System, Method, and User Interface for a Search Engine Based on Multi-Document Summarization"; which in turn claims priority benefit of the U.S. provisional application for patent Ser. No. 60/888,515 filed on Feb. 6, 2007 under 35 U.S.C. 119(e); all of which are hereby incorporated by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to search summaries. More particularly, the invention relates to search query summary creation.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Oftentimes, general search engines may be used to quickly retrieve information a user may require from large databases, including the internet. Typical search engines provide a multiplicity of results, and require a user to select each result one by one to determine the relevance of the result. It may be difficult to inspect multiple different results at once, especially when a user desires to compare and contrast the different results. Additionally, a plethora of different types of media may be available across the internet. While general search engines may provide a user with a means of searching for specific types of media, it may be difficult to retrieve multiple different file types from one search query.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that while existing search engines may provide a plethora of different search options, it may be difficult to compare and contrast the different query results in real time. Further, while certain filtering of query results may be possible, in many situations more robust query customization options may be desired in order to retrieve more accurate results from a single query.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
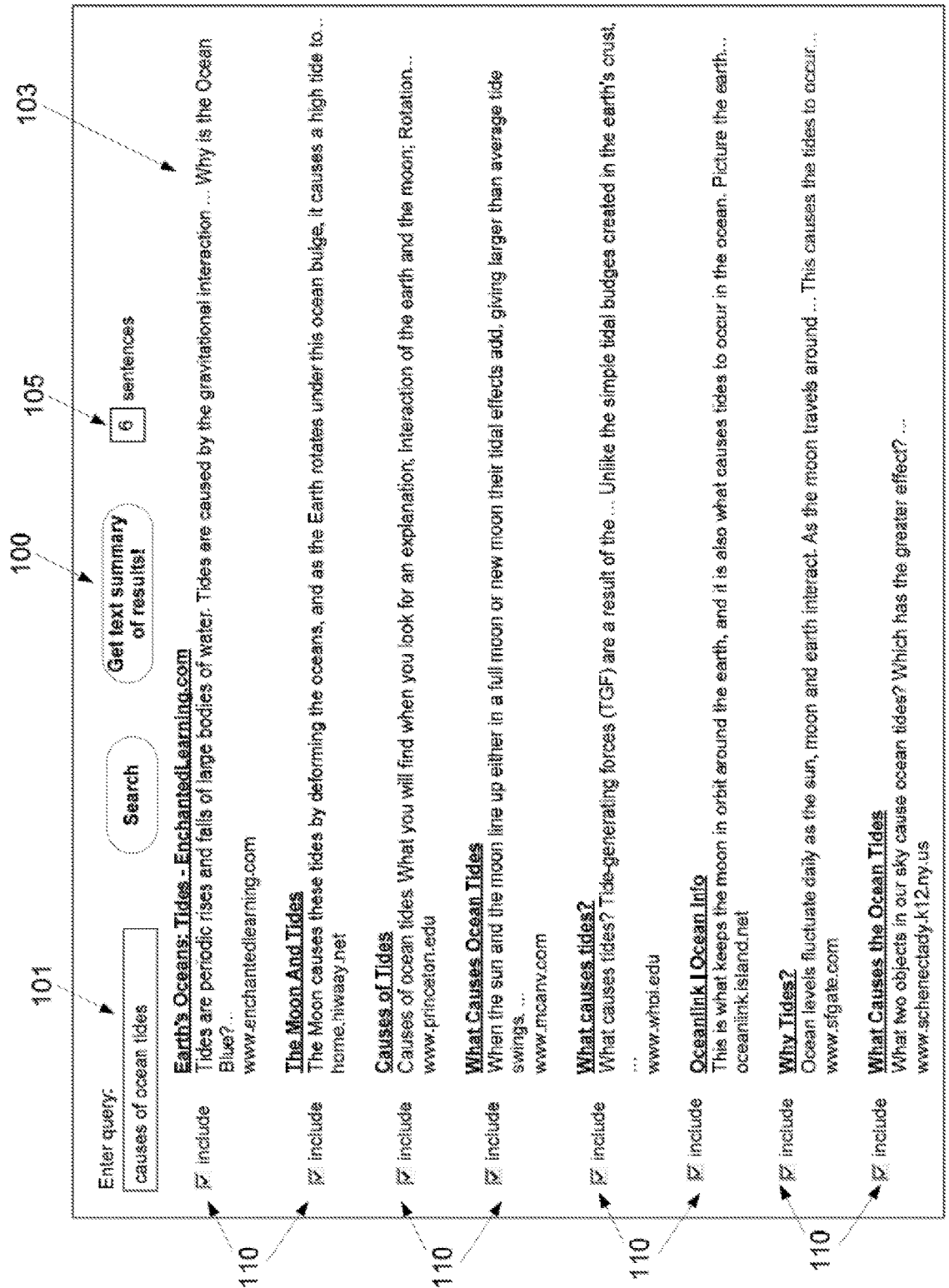
FIG. 1 illustrates an exemplary search results' page from an Internet search engine with an addition of a summary request button, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" may denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of the term "substantially" as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. At 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" may mean "significantly" or "considerably." The term "substantially" may also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said We conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit "about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning may be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar to or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to people skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred, or induced by any pattern(s) of description, embodiments, examples, or referenced prior-art that may (or may not) be provided in the present patent.

References to "end user", or any similar term, as used herein, is generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction, with some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . . "Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component may be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc.

Reciting that a mechanism/unit/circuit/component is "configured to" or "operable for" perform(ing) one or more tasks is expressly intended not to invoke 35 U.S.C. sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter. Moreover, for any claim of the present invention which claims an embodiment "consisting essentially of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes "of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; a mobile telephone; a smartphone; a tablet; a wearable computing system including, but not limited to, an eyeglass, a watch, a bracelet, an earpiece, a headband; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; speech to text and/or text to speech applications; speech recognition applications; applets; pre-compiled code; interpreted code; compiled code; and computer programs.

While embodiments herein may be discussed in terms of a processor having a certain number of bit instructions/data, those skilled in the art will know others that may be suitable such as 16 bits, 32 bits, 64 bits, 128 bits or 256-bit processors or processing, which can usually alternatively be used. Where a specified logical sense is used, the opposite logical sense is also intended to be encompassed.

The example embodiments described herein may be implemented in an operating environment comprising computer-executable instructions (e.g., software) installed on a computer, in hardware, or in a combination of software and hardware. The computer-executable instructions may be written in a computer programming language or may be embodied in firmware logic. If written in a programming language conforming to a recognized standard, such instructions may be executed on a variety of hardware platforms and for interfaces to a variety of operating systems. Although not limited thereto, computer software program code for carrying out operations for aspects of the present invention may be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, 19 um 19ughh the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Web sites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer may read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards, or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries may be different from those illustrated herein. Further, despite any depiction of the databases as tables, an object-based model could be used to store and manipulate the data types of the present invention and likewise, object methods or behaviors may be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through the telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that may access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" may include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media may be any available media that may be accessed by a general purpose or special purpose computer, including the functional design of any special purpose processor as discussed above. By way of example, and not limitation, such non-transitory computer-readable media may include RAM, ROM, EEPROM, CD-ROM or other optical disk storage, magnetic disk storage or other magnetic storage devices, or any other medium which may be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor-based memory, phase change memory, optical memory, periodically refreshed memory, and the like; the non-transitory computer readable medium, however, does not include a pure transitory signal per se; i.e., where the medium itself is transitory.

Some embodiments of the present invention may provide means and/or methods for metadata-based search summary creation. Some of these embodiments may comprise computer software. In some of these embodiments, software may be integrated into hardware, including, without limitation, uniquely-designed hardware for running embodiment software.

Preferred embodiments of the present invention provide a new type of search result, in the form of an automatically generated text summary of substantially relevant search results. Within the summary, each sentence or text fragment may have one or more references such as, but not limited to, a bibliographical reference or web address to the Web page(s) from which the text fragment was extracted. In some embodiments, the summary may constitute a digest on the topic specified by the user's query, extracting and blending together significant and relevant aspects of the results. Ideally, the user's query is satisfied, and the user does not need to navigate individual sources; however, in some embodiments the user is able to navigate these individual sources if desired. Preferred embodiments are implemented for Internet searches; however, some embodiments may be implemented to address search issues in other locations such as, but not limited to, the Intranet, an enterprise network, a standalone computer, when searching from a mobile communication device, etc. Another embodiment can be implemented as an Internet browser with a search capability, and a button or similar mechanism to generate a summary of multiple search results. Another embodiment can be a search engine integrated with an AI Language Model (e.g., like MICROSOFT BING integrated with OPENAI™, GOOGLE's™ BARD AI™, YOUCHAT™, CHATGPT™, etc.), where a search corresponds to a user question or instruction, and the response from the chatbot constitutes a summary generated based on the search query. In preferred embodiments, the graphical user interface (GUI) is in the form of a button on the main search engine page and/or on the search engine results page with a command to display a text summary of results. Once the user clicks this button, the summary is produced and displayed for the user.

Preferred embodiments of the present invention comprise the following components: search means, a multi-document summarization engine and a software program. A system implementing these components may have a human interface or an application programming interface (API). The search means may be a search engine, meta-search engine, vertical search engine, or other means of searching that accepts the user's query, matches the query against a set of documents in a search engine index, and returns a list of matching search results. A query may be entered by, without limitations, voice input and/or touch input such as, typing, clicking, etc. The search engine may be proprietary or commercially available. Depending on the particular embodiment, the search engine may be on the Internet, the Intranet, an enterprise network, a local area network (LAN), a mobile communication device, or a standalone computer or server. In preferred embodiments, the multi-document summarization engine analyzes the search results returned by the search engine, and produces a text summary of the results. Those skilled in the art will recognize, in accordance with the present teachings, that there are a variety of algorithms of multi-document summarization that may be used in embodiments of the present invention. The software program in preferred embodiments integrates the search engine, the summarization engine, and user interface actions such as, but not limited to, buttons to request the summary and to display the summary, save buttons, etc. This software program is herein referred to as the system core. Those skilled in the art will recognize, in accordance with the present teachings, that the exact mechanism for the implementation of the system core may vary, as long as the components are integrated in accordance with embodiments of the present invention.

The summary of results may satisfy the user's query fully or partially depending on the particular embodiment or system settings. The summary obtained from preferred embodiments may contain answers that the user was looking for, or at least give the user a good overview of the information contained in the document set. From the summary, the user may see which of the documents are better suited to his query, and may navigate to those documents directly from the summary.

Multi-document summarization systems are known to those skilled in the art. There is a great variety of algorithms used by different systems, targeting various domains of content, and producing different quality of summaries. In general, a multi-document summarization system reads each document in the set of documents to summarize, analyzes the syntax and semantics of the documents, extracts key concepts from the document, matches sentences or text fragments to the concepts being extracted, and constructs a summary comprising sentences or text fragments taken out of different documents in the set of documents to summarize. Those skilled in the art will recognize, in accordance with the present teachings, that the exact algorithm for summarization may vary greatly between various systems. For example, without limitation, in some embodiments the summarization algorithm may be based on natural language processing (NLP), analyzing the text of the search results, identifying key concepts or text fragments, and scoring these concepts or text fragments using various factors such as, but not limited to, relevance. In some embodiments the summarization algorithm may consider document structure, document format, metatags, or other types of data associated with the search results when identifying and scoring the key concepts or text fragments on relevance to the query. In the preferred embodiment, the key concepts and text fragments are organized in order of decreasing relevance; however, in alternate embodiments other factors such as, but not limited to, the position of a concept or text fragment on the source page, may also be taken into account. Other factors that the system may take into account when organizing the concepts and text fragments may be: predefined ranking of concepts; dynamically calculated ranking of concepts based on some criteria; ranking of the document (predefined or dynamically calculated); metadata associated with the concepts or documents; comparative rank of the author of the source text; sentiment implied by the concept or text fragment; target audience characteristics and the corresponding assessment of the concept or text fragment in view of matching those characteristics. For example, level of complexity of the content; or acceptable level of profanity; etc. A multi-document summarization system aims to produce a summary that looks like a coherent text to the user, or to give the user a good overview of the set of documents. The summary may be assembled in many ways depending on the task, without limitations, the audience, and any other factors. For example, when researching a strategy for a government decision, two summaries may be requested—one "pro", the other "con". An AI Language Model system that produces an answer to the user's question can also be considered a multi-document summarization system. In this case, source documents are being consumed by the system, and then processed according to the proprietary rules (for example, neural network rules). (It is widely accepted that neural networks process information similarly to how human brain works; however, the exact mechanism of neural network's processing is beyond the scope of this invention.) When the user queries the system, he receives the answer as a summary of multiple sources, processed by the AI Language Model. The summary looks like a coherent text to the user. Accordingly, such a model constitutes a multi-document summarization engine, thus falling into the scope of this invention.

It should be noted that some current search engines use the term "summarization" in a different sense than is used in reference to that of the present disclosure. Such current search engines may even call a list of suggested webpages, corresponding to a user's query, a summary. In their implementation, the source webpage remains whole and is not perceived as consisting of multiple meaningful fragments. In contrast, a "multi-document summarization" engine as described herein, analyzes the content of webpages, parses out key fragments and/or concepts from them, ranks/weights them, and generates a (presumably) coherent summary consisting of such fragments collected from multiple webpages. Coherence typically depends on the weighting and the algorithm to combine the fragments into the summary. It is expected that the users' quality expectations from a summary of loosely-related documents of different nature, format, and target audience, as is also typical for the Internet, are generally lower than of a coherent, linear text written by a single author for a homogeneous audience. Hence for many types of queries, it is expected that users, particularly Internet users, will prefer a summary, even of an imperfect quality, to numerous links to Web pages. If the user is not satisfied by the summary, the preferred embodiment also provides conventional search results alongside the summary as another option. It is further understood that there are certain types of user queries where a summary is not sensible or not possible to produce. There are also types of queries where the user is not interested in getting a summary on the topic of the query, but rather wants to locate a particular Web page. These searches may not benefit from embodiments of the present invention. However, a great number of other types of searches will. In the case of a neural network, the system may attempt to perform like a human brain. Therefore, individual sources and text fragments get processed, and the neural network learns from them, becoming able to distinguish the patterns in the text, and generate a meaningful answer to the user's query. In this case, the individual sources have been already pre-processed by the system; the system learned from them; and is now able to return a summary looking as a coherent response. The quality of such summaries is high, close to the summaries generated by humans.

The preferred embodiment combines a search engine and a multi-document summarization engine in a way that is not currently available. Traditionally, search results have been perceived as a list of documents, or links to documents. As for summarization, there are some search systems that provide individual summaries of search results, which is different from multi-document summarization. However, the preferred embodiment of the present invention produces a summary of multiple search results, and treats the said summary as the main result of the user's search.

FIG. 1 illustrates an exemplary search results page from an Internet search engine with an addition of a summary request button 100, in accordance with an embodiment of the present invention. The search results page may display a user's query for "causes of ocean tides" in query field 101, as well as search results list 103 as links to documents that were found by the search engine while matching the query. The user's query may be entered by, for example, without limitation, voice input, touch input such as, typing, clicking, etc., and any other means of entering information known in the art. In the present example, each search result in search results list 103 may be displayed with relevant information such as, but not limited to, a title, a URL to the location of the document, a snippet of text that the search engine has associated with the result, etc.

In the present embodiment, the page may comprise three additions to a conventional display of search results including, without limitation, summary request button 100, text fragments field 105, and checkbox 110 for each search result in search results list 103. In the present embodiment, summary request button 100 may be in the top right section of the screen and may read "Get text summary of results!" If the user clicks summary request button 100, a summary of the results that are displayed on this page may be generated by the system. In alternate embodiments, summary request buttons may have various designs with various different commands on the buttons and may be located in various places on the search page and on various pages of the search engine. For example, without limitation, a summary request button may be placed on the main page of the search engine as well as on the results page, in which case the step of displaying the conventional search results may be bypassed, and the user may be taken directly to the summary page. Text fragments field 105 may indicate the number of text fragments or sentences to be included in the summary, and may be specified by the user in text fragments field 105. In this example, only six sentences are requested to allow for the display of the summary to fit on a single page. Checkboxes 110 may be located next to each search result in search results list 103, enabling the user to specify which of the search results are to be included in the summary. In the present embodiment, a default setting includes all of the search results in the summary; however, alternate embodiments may have different default settings. To re-iterate, the present invention is agnostic as to the particular language model or AI that is employed to generate the summarization text fragments displayed, or to smooth and "massage" them into a final coherent natural language summary displayed to the user making the query. Typically, it is well known by those skilled in the art that there are at least two language model/AI frameworks concerning the processing of natural language; that is, semantic/logic based and statistical models based, wherein semantic/logic based AI language model frameworks (e.g., without limitation, Ontological, Graph/semantic networks, will tend to preserve one-to-one mapping of summary text fragment(s) and original source document(s), whereas statistical AI language model frameworks (e.g., without limitation, Large language models (LLM) like ChatGPT) have no correspondence preserved between any summary text fragment(s) and any original source document(s). Hence, search systems based on LLMs/statistical AI language model frameworks will typically have to take the LLM summary text output and perform a conventional reverse look up to simulate a mapping of particular summary text fragment(s) to particular suitable support source document(s), even if they are not the originals, and may be completely in error. From the user's point of view when using the Graphical User Interface (GUI) of the present invention, there may be no visual and little, if any, functional difference between the summaries produced by any kind of search system according to the present invention that is responding to a user query, as outlined in the following figure and description.

Figure 2:
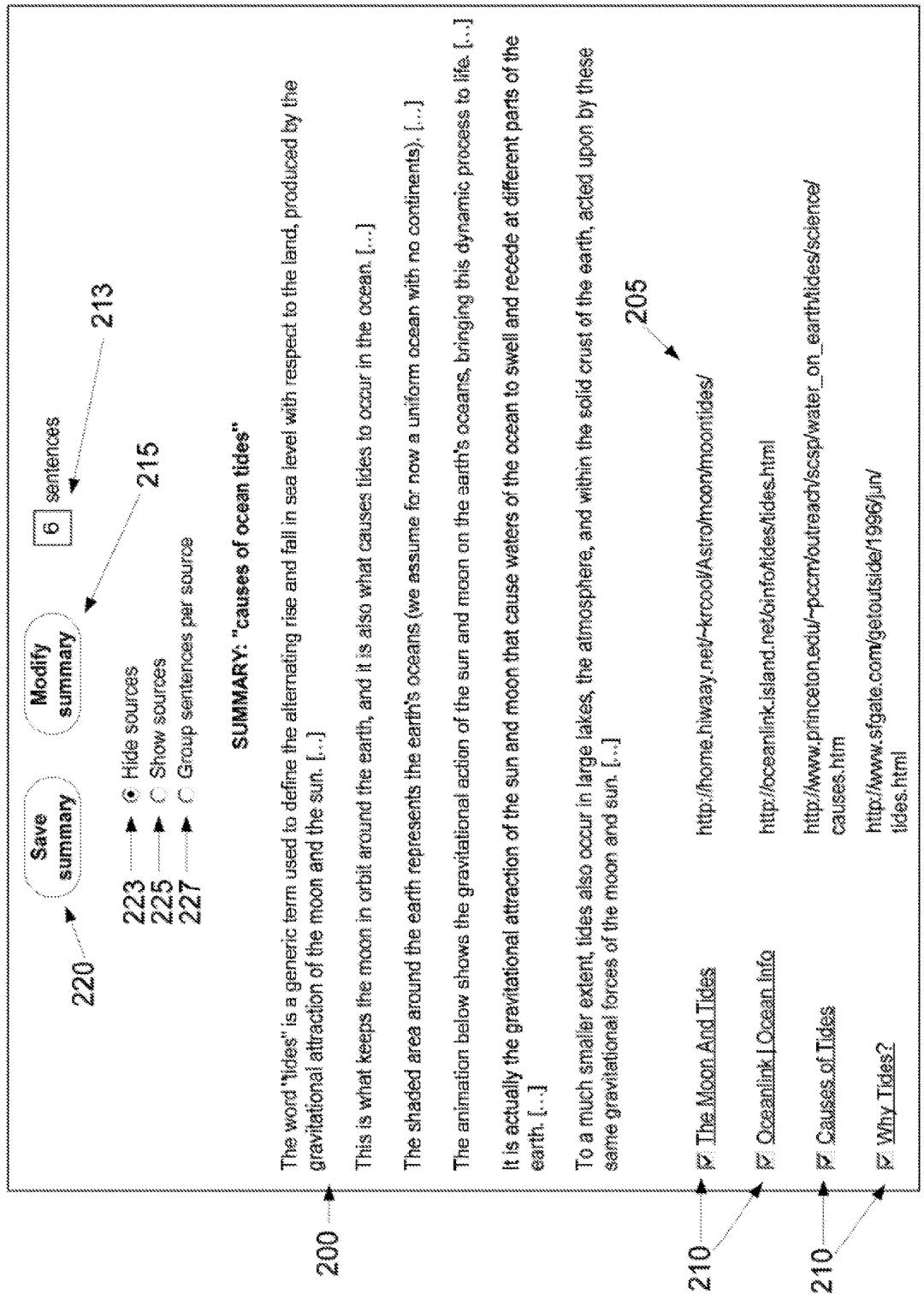
FIG. 2 illustrates an exemplary summary on a user's query, produced by a search system, in accordance with an embodiment of the present invention.

FIG. 2 illustrates an exemplary Graphical User Interface (GUI) of summary 200 on a user's query, produced by a search system, in accordance with an embodiment of the present invention. In one interpretation of the present embodiment, explained in terms of search systems that are at least in part based on a generally one-to-one mapping of summary text fragment(s) and original source document(s), summary 200 may be presented as a list of sentences; however, in alternate embodiments, the summary may be displayed in different formats such as, but not limited to, a list of key concepts, a cluster hierarchy, a tag cloud, etc. The sentences or text fragments within summary 200 may originate from various sources, which may be listed below the summary in source list 205. The sources in source list 205 may refer to the documents or Web pages found by the search engine as displayed in a conventional search result, shown by way of example in FIG. 1. The sources in source list 205 may be clickable links, which may be used to take the user to a corresponding source web page. Note that not all sources from the search shown in FIG. 1 are listed in source list 205. It is up to the multi-document summarization engine to decide which sources to include and in what order. Factors such as, but not limited to, the quality of the sources and the length of the summary as requested by the user may affect which sources are used in summary 200 and displayed in source list 205. The multi-document summarization engine may also determine whether duplicates are present in the summary. If a duplicate is present, it may be removed from the summary. If the multi-document summarization engine is capable of natural language processing (for example, when it is integrated with an AI Language Model), it may detect that some text fragments coming from different sources are either identical, or substantially similar in terms of the content they contain. In this case, such duplicate or substantially similar text fragments can be merged into one text fragment. All sources that have contributed to such text fragments can be referenced in the summary.

Additionally, the user may have an option of removing some of the sources by deselecting checkboxes 210, which may be located next to each source in source list 205, and regenerating summary 200. When summary 200 is regenerated, the system may only use sources from source list 205 that remain selected. The user may also change the number of sentences in summary 200 by changing the number in a text fragments field 213. In alternate embodiments the user may have different options for controlling the length of the summary for example, without limitation, a setting to set the overall number of pages, a setting to set the length of the summary as a percentage of the total amount of text in the sources, etc. In the present embodiment, a Modify summary button 215 may be used to regenerate summary 200. The user may also click a Save summary button 220 to, for example, without limitation, save summary 200 in a file on a local or network drive, send the summary as an email, print the summary page, etc. In an alternate embodiment, all original sources may be displayed, allowing the user to request a modified summary that would use the sources specified by the user.

A group of radio-buttons enabling the user to control the presentation of sources within summary 200 may be presented. The setting displayed in the present example may be a Hide sources setting 223, which may indicate that each sentence in summary 200 is not followed by a reference to its corresponding source. The present embodiment may also comprise a Show sources setting 225 and a Group sentences per source setting 227. Show sources setting 225 may be used to display the source of each sentence after the sentence within summary 200, as shown by way of example in FIG. 3, and Group sentence per source setting 227 may be used to group the sentences in summary 200 by source and list the source after each group of sentences. Alternate embodiments may have various other features and settings for the user interface such as, but not limited to, a language setting for the query, a rating feature, a print feature, a save feature, a feature enabling users to share summaries, a comment feature, a voting feature, etc. Other user interface setting may include: allowing the user to refine the original query, for example by entering a different wording, or by specifying the concepts that would modify the topic of the query; turn on or off the display of relevance scores; marking some sentences in the summary for removal, and generating a summary without the removed sentences. The text summary may also be overlayed with graphics, video, and other types of media if the multi-document summarization engine is capable of constructing summaries out of a variety of media elements.

While FIG. 2, was explained in terms of how a one-to-one mapping-based search system would generate the claimed user interface shown, the following explains how a search system based on statistical AI language model frameworks might generate the same claimed user interface shown. That is, FIG. 2 illustrates an exemplary summary 200 Graphical User Interface (GUI) that may be generated by a chatbot based on Statistical AI Language Models (e.g., LLMs). In the present embodiment, the Summary has a title "causes of ocean tides", which in the present example is the topic query requested by the user. This is akin to a user making a query to the search engine, and the engine preserving it and displaying on top of search results. Typically, the summary may include multiple paragraphs/sentences (text fragments), that attempt to present a coherent narration on the topic requested by the user.

Each text fragment may have been either directly extracted from a particular source, or automatically rephrased or "massaged" for coherence purposes when being integrated into the summary. The sources are presented as part of the output in 205 and 210. The presence of such table alongside the summary is optional, yet may be useful. For each source, the title and URL are present (205). The sources may be numbered, allowing the summary to refer to the sources as bibliographical references (described below). An optional checkbox may be provided next to each source title, which may be checked by the user when the source is to be included in the summary, and unchecked when it is to be excluded.

The user may utilize various controls of how verbose the output of Statistical AI Language Models may be—in this case the number of sentences 213 may be increased or decreased by the user in the output. Other optional GUI controls for LLM based systems includes controlling the 'temperature' of the LLM out, which may, at least in part, control how factual or fictional the summary is with respect to the search/topic input query.

Modify summary button 215 allows the user to request the Statistical AI Language Models to regenerate the summary. Any unchecked sources may be excluded from the summary, and the updated number of sentences may be taken into account. If the user checks an excluded source in the next iteration within the same session, it may be again included into the summary.

There are various optional controls to either hide sources or present them in various ways; e.g., see elements 223, 225, and 227. The present drawing depicts an exemplary summary configured with the sources hidden. Another possible way (controlled by Show sources 225 of FIG. 2) is to display a bibliographical reference after each text fragment in a form of [1], where each number corresponds to a source where the text fragment came from. The source number may be hyperlinked to point to the source webpage, allowing the user to navigate there. As desired by the needs of the particular application, more than one source may be referenced after a text fragment, in case a similar content exists in more than one source.

Moreover, while not shown in FIG. 2, it's mentioned in the present disclosure that, in some other embodiments, the focus of the summary may be shifted by the user. For example, without limitation, Statistical AI Language Models may extract a tag cloud of related concepts representing the content of the sources. In such embodiments, the user may select some of the concepts, click a "Modify" button, and the summary may be regenerated on the original topic, however, with an increased focus on the selected concept(s). Similarly, Statistical AI Language Models may allow the user to expand on the original topic by providing additional information in verbal form; for example, without limitation, clarifying/narrowing down the originally requested topic, or by asking to shift the focus of the answer to cover certain related concepts, or to make the summary more verbose, etc. Statistical AI Language Models will keep the context of the conversation, and shift focus or include additional information as requested by the user. In some other embodiments the user may also express, in some manner, his/her level of dissatisfaction with the summary, including either verbally or by ranking it, thereby enabling the Statistical AI Language Models to take this into account when regenerating the summary.

In the present embodiment, the Modify summary button 215 may be continuously used by the user during the session, pruning the list of sources by unchecking some and bringing some back later, until the desired or targeted quality content of the summary is achieved. In the Statistical AI Language Models implementation, similarly continuous conversational input by the user may iteratively produce the desired quality output.

In the present embodiment, the save summary button 220 enables the user to save the summary. However, in other embodiments, any suitable means of acting upon the completed summary may be employed in the GUI, which may include, without limitation, printing it, sharing it via social media or enterprise workflow, or in any other suitable way. In some applications, this functionality may be integrated with a search browser, using its native capabilities of saving/printing/sharing, or custom made by the application based on this invention.

In some other embodiments, the summary in the GUI may optionally include references to related/suggested sites, which, for example, without limitation, may come from the search engine, or be based on the concepts extracted by the Statistical AI Language Models as explained above.

In some more simplified GUIs based on summarization outputs of Statistical AI Language Model based search systems, only the following elements of FIG. 2 might typically be included; that is, Summary 200; Show sources setting 225 that produces bibliographical references; and Modify summary 215.

Figure 3:
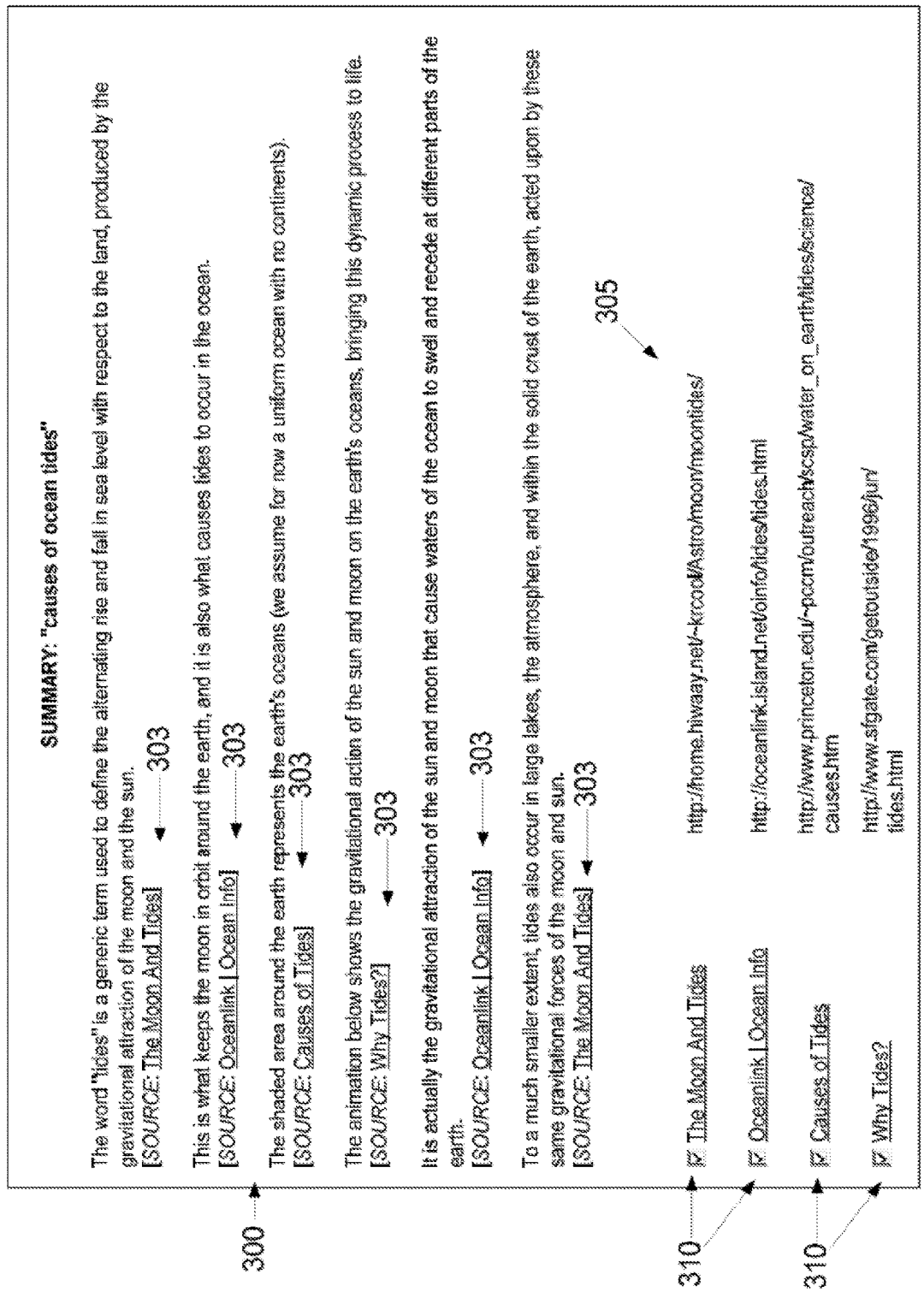
FIG. 3 illustrates an exemplary summary on a user's query, where each sentence or text fragment in the summary is followed by a reference to its source, in accordance with an embodiment of the present invention.

FIG. 3 illustrates an exemplary summary 300 on a user's query, where each sentence or text fragment in summary 300 is followed by a reference 303 to its source, in accordance with an embodiment of the present invention. This setting may be defined by a "Show sources" setting, as shown by way of example in FIG. 2. In the present embodiment, references 303 are listed as clickable URLs to the web pages from which the text fragments are sourced, which may be used to take the user to the corresponding source web page. The present embodiment may also comprise a source list 305 and checkboxes 310 that enable the user to select or deselect the sources to be included in summary 300.

The fragments of text comprising summary 300 may be ordered so as to create a coherent presentation of content to the user, as opposed to their order on the source Web pages. Therefore, even though some text fragments are sourced from the same Web page, they are generally not sequentially presented in summary 300. The exact mechanism of ordering of text fragments is not specified by the present embodiment, however, the example illustrates that the system summarized a set of documents as a whole, as opposed to concatenating individual summaries of each source. Furthermore, some embodiments of the present invention may specify how to order the text fragments, for example, without limitation, alphabetically by source, by relevance, etc.

Figure 4:
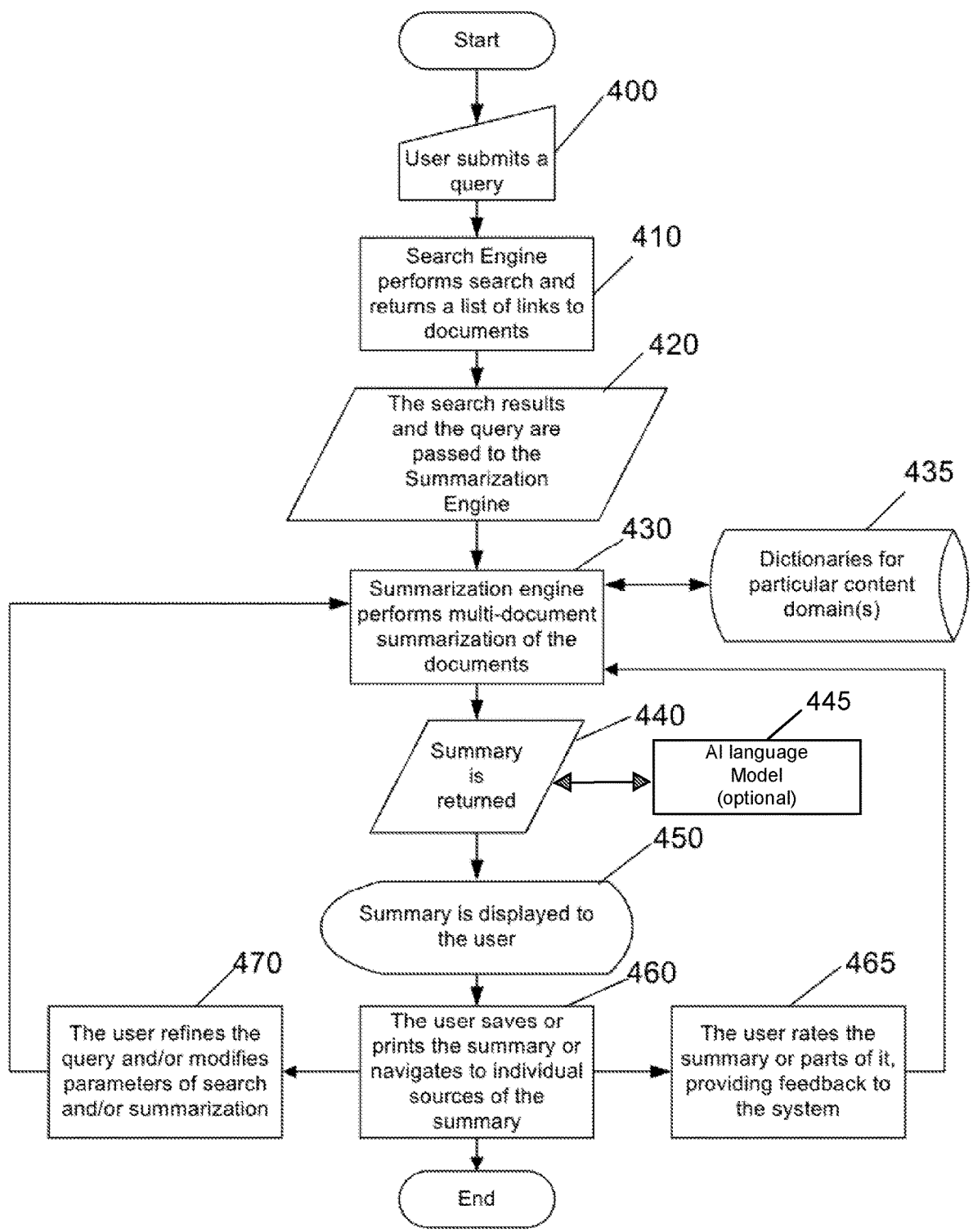
FIG. 4 is a flowchart illustrating an exemplary process for the interaction between a search engine and a summarization engine, in accordance with an embodiment of the present invention.

FIG. 4 is a flowchart illustrating an exemplary process for the interaction between a search engine and a summarization engine, in accordance with an embodiment of the present invention. The following steps are presented to describe the process according to the present embodiment. The process may begin with step 400, wherein a user may submit a query to a search engine or database. In step 410, the search engine may receive the query, locate matching documents in the search engine data store, and return a list of links to the documents. The search results may be in various forms such as, without limitation, documents or files containing text or fragments of text. These documents may be in any format readable by the system, for example, without limitation, HTML, TXT, DOC, RTF, PPT, XLS, XML, etc. Also, the language of the text may be any language, and the language of the various documents in the results may be the same or different. In various embodiments the search results may originate from various sources such as, but not limited to, the Internet, an Intranet, an enterprise network, a LAN, a database, or computer file generated by a computer program based on an algorithm, etc. As will be appreciated by one skilled in the art, a single source or a combination of different sources may be used to create search results. In the present embodiment, the search results may be received by a system core, which may be a piece of software integrating other pieces of the present embodiment. In step 420 the system core passes the top links as rendered by the search engine, and the original user's query to a multi-document summarization engine. The number of links passed to the multi-document summarization engine may be specified by the user or configured internally. Furthermore, the language of the query and the documents may be specified to the multi-document summarization engine or automatically identified by the multi-document summarization engine, and the multi-document summarization engine may skip a document if the language is not recognized.

In a step 430 the multi-document summarization engine may receive the query and the links to the documents. Then, the multi-document summarization engine parses each individual document to extract key concepts and corresponding text fragments or sentences and performs multi-document summarization of the documents based on the extracted concepts, producing a text summary representing a digest of the search results. Those skilled in art will understand that it is up to a particular multi-document summarization engine to rank the concepts according to its own algorithm and define which concepts are key in each case. The summary may comprise key concepts, text fragments or sentences matching these concepts, or a combination of the two. The user query may be taken into account, to focus the summary on a particular topic using means such as, but not limited to, NLP (Natural Language Processing) or metadata to help determine relevance of the results. In the present embodiment, if the system is unable to use the query, for example, without limitation, if the query is unrecognized by the system, empty, or not passed to the system, the system may generate a summary of key concepts in the documents without focusing on a particular topic. In an alternate embodiment, if the system is unable to use the query, the system may produce a summary based on a topic derived by the system that is based on predefined or built-in criteria or based on additional parameters. In other alternate embodiments, if the system is unable to use the query an error message may be sent to the user that may ask the user to change the query. A relevance score may be calculated by the system according to any algorithm such system uses for each concept or text fragment, and this relevance score may or may not be displayed to the user in the summary and may be used by the system for learning.

In the present embodiment, content dictionaries 435 comprising words, phrases or concepts related to a particular content domain may be used by the multi-document summarization engine. The words, phrases and concepts in content dictionaries 435 may be characteristic for particular information domains, or may be not pertinent to the content domain, enabling the multi-document summarization engine to adjust its algorithm to better suit the particular information domain. Rules that help the system to understand and classify the content may be used. Content dictionaries 435 may be static, dynamically populated by users or administrators, or accumulated by the system through self-learning features of the system. In the case of a multi-document summarization engine implemented as a chatbot conversing with the user, content dictionaries 435 may correspond to an AI Language Model, which is able to continuously learn new information. Other information that may be used by the self-learning features may include, without limitation, feedback from users or relevance scores. Alternate embodiments may not comprise self-learning features.

In a step 440 of the present embodiment, the summary may be returned to the system core. As an optional step, step 445, the system core may pass the summary to an AI Language Model, which will make the summary more coherent, so that each previous sentence or paragraph integrates well with a subsequent one. Additional enhancements to the summary can be provided by the AI Language Model according to its capabilities, and potentially a set of parameters specified by the user. Such parameters may include the level of coherence of the text, or setting the tone of the response—e.g., conversational, academic, humorous, etc. In a step 450 the system core may display the summary to the user. In a step 460 the user may perform various functions such as, but not limited to, save the summary on a local or network drive, print the summary, edit the summary if the system core provides a text editor, navigate through the search engine to the individual sources, etc. If the user is satisfied at this point, the user may end the process. Otherwise, the user may be prompted to rate the summary based on criteria such as, but not limited to, satisfaction and quality and pass the feedback to the summarization engine in a step 465, "Like"/"Don't like", or may request a modified summary in a step 470. The user may have the option to rate the overall summary, individual text fragments, or the source documents returned by the system in step 465. This feedback may be used by the self-learning feature of the system. The user may also modify parameters such as, but not limited to, the length of the summary, the way references are represented, the sources that should or should not be included in the summary, or any other parameters exposed by the system, by requesting a modified summary in step 470, and the system may return to step 430 to perform another multi-document summarization of the documents using the new parameters.

In an alternate embodiment, a search engine may be integrated with the summarization engine into one system. This would enable the system to analyze each individual document as the document is added to the data store of the system rather than during the multi-document summarization process. Therefore, the summarization engine in this case does not need to repeat this analysis in step 430, thus making the whole operation much faster. In this embodiment both the search engine and the summarization engine have access to the documents, for example, without limitation, through a database or file server.

In an alternate embodiment, the system may be implemented without a separate system core. For example, the search engine may be calling the summarization engine, passing the summarization engine the documents. In this case, the search engine implementation would comprise the system core. Alternatively, the summarization engine may be calling the search engine, receiving back the documents to summarize. In this case, the summarization engine implementation would comprise the system core.

The preferred embodiment described above comprises a search engine integrated with a multi-document summarization engine. However, an alternate embodiment of the present invention comprises an Internet directory integrated with a multi-document summarization engine instead of a search engine. An Internet directory comprises a hierarchy of categories that the user browses. At the lower levels of the hierarchy, the user may be presented with a list of matching documents or Web pages, which may be processed by the multi-document summarization engine. In this case, steps 400 and 410 of the process previously described are not applicable. Instead, the user may browse the Internet directory until the user finds a page that contains links to the documents pertinent to the user's topic of interest. Those links may then be passed by the system core in step 420 to the multi-document summarization engine. For example, without limitation, a user who is searching for legal advice in a Web directory such as, but not limited to, BOTW.org, navigates down to a particular area of his legal issue, and requests a summary of the documents listed on that level of the directory. The summary serves as an overview of the key concepts related to the user's issue, extracted from the documents in the directory.

Another alternate embodiment of the present invention may be implemented in a question answering system. A question answering system accepts a user's question or directive. The question is then processed by the question answering system according to any given rules that such system utilizes, and a number of possible responses (whether already pre-existing in the system, or generated according to any proprietary rules) are identified. The system may then pass the results to a multi-document summarization engine, which produces an overall summary of the results as the answer to the user's question. A knowledge base residing on a computer network, for example, without limitation, the Internet, the Intranet, or a LAN, or on a standalone computer or server may be implemented in another alternate embodiment. The implementation of a knowledgebase is similar to the implementation of a question answering system. Question answering system may also be based on an AI or Neural Network trained Language Model such as, without limitation, those employed in generative pre-transform (GPT) methods such as those done by OPENAI™, GOOGLE™'s BARD AI™, YOUCHAT™, CHATGPT™, and others. In typical use, an AI language model uses machine learning to conduct a probability distribution over words used to predict the most likely next word in a sentence based on the previous entry. Language models learn from text and can be used for producing original text, predicting the next word in a text, speech recognition, optical character recognition and handwriting recognition. In the case of the AI Language Model, the user may not only ask for an answer to a question, but also request the system to generate content on the user's topic of interest. The system accepts a user's query, processes it according to the proprietary rules (for example, implemented as a neural network), and generates a response based on the knowledge it has learned from the sources preloaded into the neural network. In this case, the AI Language Model acts as the summarization engine itself. Such a question answering system is essentially a knowledgebase, but rather than serving individual knowledge content items, it generates a summary of content from them according to the neural network rules. Note that the mechanism of the multi-document summarization may vary between embodiments of this invention: in one case the summary may be compiled from individual text fragments from different sources; whereas in the case of an AI Language Model the system has preprocessed the sources in advance and built a model based on them, and learned to produce a summary based on the available knowledge. Both mechanisms are similar.

Figure 5:
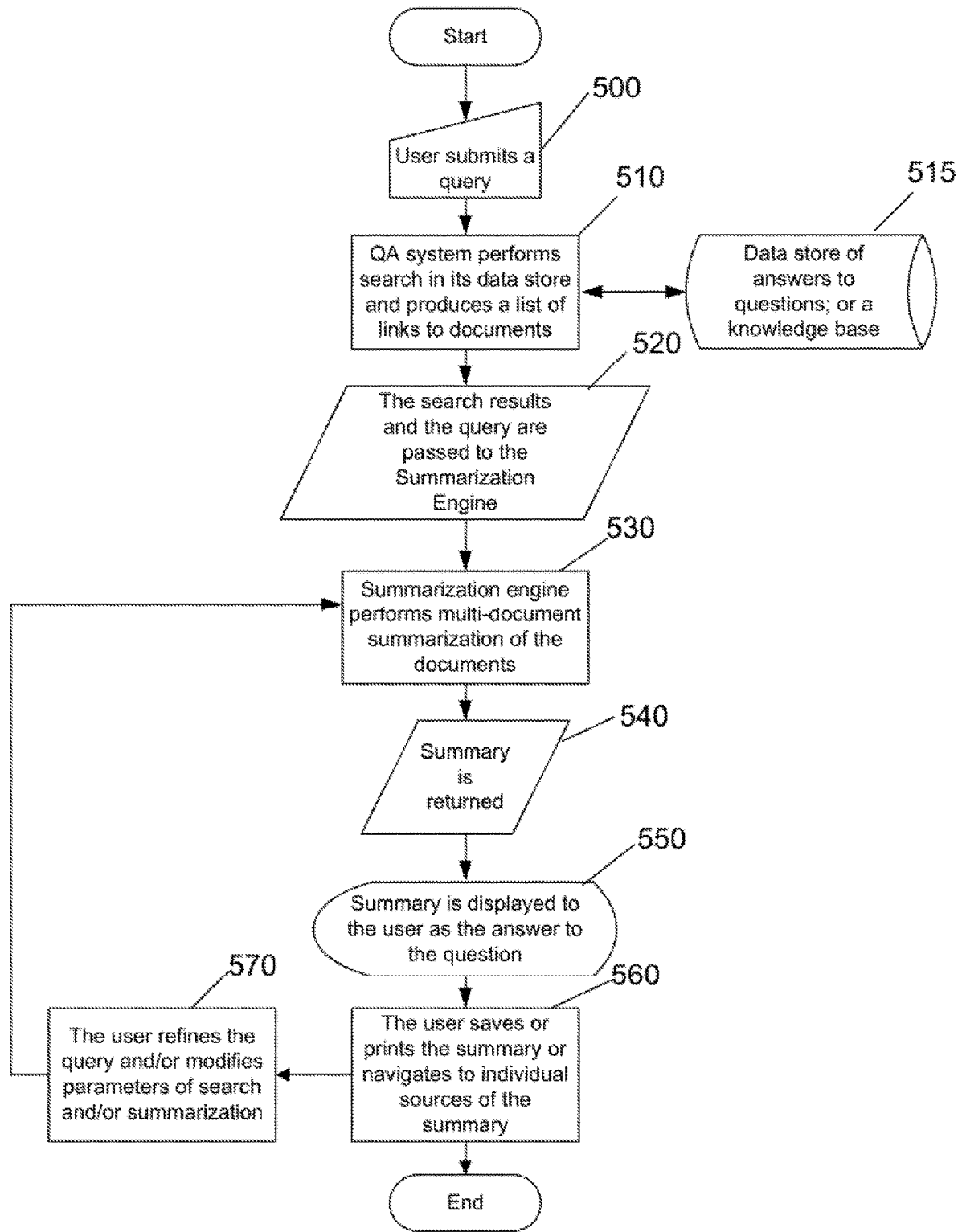
FIG. 5 is a flowchart illustrating an exemplary process for the interaction between a question answering system and a summarization engine, in accordance with an embodiment of the present invention.

FIG. 5 is a flowchart illustrating an exemplary process for the interaction between a question answering system and a summarization engine, in accordance with an embodiment of the present invention. In the present embodiment, a question answering system is used instead of a search engine. The difference is that the question answering system itself performs a search for documents matching the user's query in an answer data store 515 comprising answers to various questions or a knowledgebase may then pass the results to the summarization engine and return the multi-document summary as the answer to the user.

In the present embodiment, the process begins at a step 500 wherein a user submits a query. In a step 510 the question answering system may perform a search in answer data store 515 and produce a list of links to documents. In a step 520 a system core may pass the search results and the query to a multi-document summarization engine. In a step 530 the multi-document summarization engine may perform a multi-document summarization of the results as previously described in accordance with FIG. 4, step 430. In case of an AI Language Model used as the multi-document summarization engine, step 530 consists of a model that has been continuously learning from the knowledgebase, and is able to generate content in response to a query. The summary may be returned to the system core in a step 540, and in a step 550 the system core displays the summary to the user as an answer to the query. In a step 560 the user may save or print the summary or may navigate the individual sources cited in the summary. If the user is satisfied with the summary, the process ends. If the user wishes, the user may refine the query or modify the parameters of the search and/or summarization in a step 570. The system may then return to step 530 to perform the multi-document summarization again using the refined query and/or new parameters.

In an alternate embodiment, a computer program installed on a standalone computer, or a LAN server calls a search engine via an application programming interface (API). This computer program may then receive the links to the documents and passes the links to the summarization engine. Subsequently, the computer program may receive the summary from the summarization engine and displays the summary to the user.

In another alternate embodiment, a computer program installed on a mobile communications device may call a server application passing along a query from the user. This server application may then pass the query to a search engine and receive links to documents that the search engine finds as results. The application may then pass the links to the summarization engine, receive the summary, and return the summary to the mobile device to display to the user.

In yet another alternate embodiment, an application may be implemented as a computer program running on a stand-alone computer. In this embodiment, the computer program may perform a search on the local computer drives or network drives and summarizes the found search results on the same computer.

In yet another alternate embodiment, a web page or number of web pages comprising a web application may call a search engine and receive back links to documents. Subsequently, the web page may pass the links to a summarization engine, receive the summary from the summarization engine, and display the summary to a user. In another alternate embodiment, a web service rather than a web page may be used to call the web application that interacts with the search engine and summarization engine. In this embodiment, once the web service receives the summary, the web service may return the summary to its caller application to peruse the summary in any desired fashion.

In yet other alternate embodiments, an Internet browser plug-in or add-on, or an application installed on a mobile communication device may be used. In these embodiments the Internet browser plug-in or add-on may either call on a search engine to receive links to documents or screen-scrape the results of a search on a Web page to receive links to documents. The Internet browser plug-in or add-on may then send the links to a summarization engine, receive back the summary, and display the summary to a user.

Figure 6:
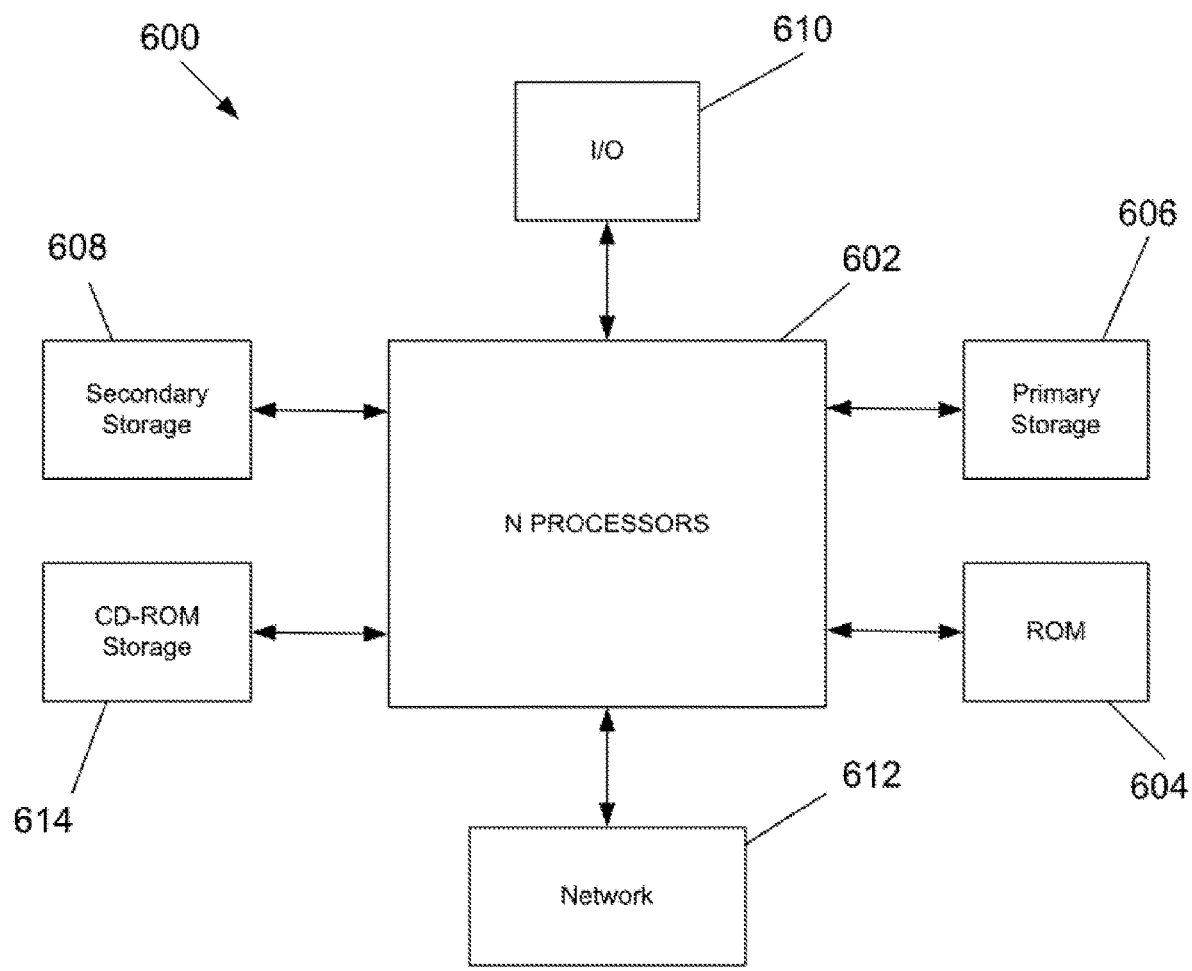
FIG. 6 illustrates a typical computer system that, when appropriately configured or designed, may serve as a computer system in which the invention may be embodied.

FIG. 6 illustrates a typical computer system that, when appropriately configured or designed, may serve as a computer system in which the invention may be embodied. The computer system 600 may include any number of processors 602 (also referred to as central processing units, or CPUs) that may be coupled to storage devices including primary storage 606 (typically a random access memory, or RAM), primary storage 604 (typically a read only memory, or ROM). CPU 602 may be of various types including microcontrollers (e.g., with embedded RAM/ROM) and microprocessors such as programmable devices (e.g., RISC or SISC based, or CPLDs and FPGAs) and unprogrammable devices such as gate array ASICs or general purpose microprocessors. As is well known in the art, primary storage 604 may act to transfer data and instructions uni-directionally to the CPU and primary storage 606 is used typically to transfer data and instructions in a bi-directional manner. Both of these primary storage devices may include any suitable computer-readable media such as those described above. A mass storage device 608 may also be coupled bi-directionally to CPU 602 and provides additional data storage capacity and may include any of the computer-readable media described above. Mass storage device 608 may be used to store programs, data and the like and is typically a secondary storage medium such as, but not limited to, a hard disk, solid state drive, etc. As will be appreciated by one skilled in the art, the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 may also be coupled to an interface 610 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Any of which may be used for entering or inputting search queries and/or instructions. Finally, CPU 602 optionally may be coupled to an external device such as a database or a computer or telecommunications or internet network using an external connection as shown generally at 612, which may be implemented as a hardwired or wireless communications link using suitable conventional technologies. With such a connection, it is contemplated that the CPU might receive information from the network, or might output information to the network in the course of performing the method steps described in the teachings of the present invention.

In the foregoing some embodiments are described as generating a multi-document text summary. While text documents may be typically analyzed by the system in order to generate a coherent document for the user, in some embodiments the multi-document summary may also include a multiplicity of suitable media in addition to or rather than text. In these embodiments, source documents may include, without limitation, images, videos, audio, and other media formats in addition to or separately from text documents. These different media formats may also be included, without limitation, into the generated summary. The inclusion of multiple media formats may help to support the user's understanding of the summary with visuals, audio, and other media objects, which may be used to further enhance the user's experience. It is contemplated that the logic used to include the media objects may be different in various different embodiments. For example, without limitation, one embodiment may use metadata accompanying the media objects such as, but not limited to, a title, a description, an author, etc. In another embodiment, the system may analyze the text describing a particular media object, even when such text is not directly a part of the metadata describing the image. For example, without limitation, the text may be a user comment or caption on an image or video, a description of the image or video, user reviews, etc. While such text may not be metadata to a particular media object, such text may still be used to deem the object relevant to the summary that is being generated by the system. If the system deems the media object relevant, the object may be included, without limitation, in the summary, alongside other fragment(s) of text or other relevant media objects from the source documents.

As will be appreciated by one skilled in the art, multi-document summarization may be used to summarize and compile multiple different forms of media elements, and may not be limited to text-based documents. For example, without limitation, media elements may include text, images, videos, audio files, etc. In order to summarize such alternative media elements (i.e. media elements other than text-based documents), text, metadata, descriptions, comments, reviews, etc. associated with the alternative media element, or inferred by the system for such element, may be used to determine the relevance of the alternative media element, and based on the determination, the alternative media element may be included In the multi-document summary. An example of inferring relevant information for a media element may be a system that analyzes an image and identifies objects depicted on it, e.g. sky, bird, plane, etc. Such inferred metadata may potentially be used by the multi-document summarization engine for bringing the image, or parts of the image, into the generated summary. For example, without limitation, a user may generate a query including "The United States". As a result, a user may receive information such as, but not limited to, a coherent sequence of relevant text fragments on the history and political environment of the United States, video clips related to the United States such as of historical moments, images related to the United States such as presidential portraits or historic landmarks, sound files related to the United States such as presidential speech audio files or an audio file of the national anthem, etc. The multi-document summarization process may bring fragments of various documents into the summary. When the multi-document summarization process is applied to media elements, a partial image may be cropped out of the image, for example, a face from a presidential portrait, or a balcony of a historic landmark are being included into the summary, rather than the whole photo; or a short clip of a video recording of the president's speech mentioning a certain event, as opposed to the full speech. Automated crop-out or clipping of a video or image may be used by a particular implementation. Additionally, various social media elements including, without limitation, social media posts, blog posts, user images, user videos, user comments, product reviews, etc., may also be included in results from a query, and their fragments subsequently included in the multi-document summary. In an embodiment, the fragments of media elements including, without limitation, social media posts, blog posts, user images, user videos, user comments, product reviews, etc., may accompany a text summary for illustration purposes or participate in the summary on the same level as text fragments. Text elements may not be present in the summary, and only other media elements are present. An example of a question answering system based on multi-document summarization of images and videos is DALL-E by OPENAI. Yet another type of media that can be served by a multi-document summarization system is software code, i.e., computer programs written in a programming language according to the user's instruction, or translated from the one programming language to another as directed by the user.

Voice recognition techniques may allow an audio such as but not limited to a voicemail or a recorded speech, to be transliterated into text. The translated text may be further split into text fragments. In one embodiment, an audio fragment may be included in the resulting summary. In another embodiment, the fragment of the translated text based on the audio may be included in the resulting summary. In a further embodiment, text fragments and/or audio fragments may participate in the summary on an equal basis. In this case, a particular fragment of an audio would be included into the resulting summary based on the analysis of the transliterated text from such fragment.

Image recognition techniques may allow an image such as but not limited to a photo, to recognize what is depicted on the image. An image area may describe the surface properties of the image. The image area is surrounded by a boundary. Based on the physical properties of the image area, a number of fragmented image areas may be defined. For example, but not limited to, a digitized painting depicts a person's face looking up and seeing a bird and a plane in the sky. Objects in the image may be identified by image recognition techniques. In some embodiment, each identified element such as but not limited to, a bird, a face, a plane, etc., may be associated with an explanatory text. For example, such explanatory text may be just one word—"bird", but may also be longer—for example, coming from a Wikipedia article on birds. The explanatory text of such partial image may be further analyzed, and included in the resulting summary as a text fragment. Alternatively, a full image or a fragment of the image may be inserted in the multi-document summary as opposed to the explanatory text. For example, the full image or the fragment of the bird from the painting may be placed in the multi-document summary alongside the text, audio, or other fragments. Image recognition and cropping techniques may crop out the bird, face, plane, or any other image fragment from the photo. Image fragments may also be superimposed upon each other. Some systems based on neural networks have learned to create images at user's request. For example, a user may request to create an image of a cat dressed up and looking like a gangster from the 30s, and the system will generate it (this is done in DALL-E). Such an image would be a compilation of fragments of existing sources (e.g. images of cats and gangsters), potentially modified by the system using graphic algorithms; and the algorithm that the system applies to mix them together in a new image. Such an algorithm may be based on a neural network model. In another embodiment, music can be composed by the system that has processed multiple sound sources, and learned to mix the music fragments up into a new creation (this is done in Soundraw).

Video object detection is the task of detecting objects from a video as opposed to detecting objects in images. A video file may include a collection of images that are sequentially presented to create motion effects. Object detection in the video file may also be based on the same idea of detecting objects in an image file. Splitting a video into fragments may be done manually or automatically based on the recognition of accompanying voice-over or specific video parameters such as but not limited to, color change from black and white to full color, or any other parameters or with video editors. Image fragmenting determine where the area of objects is, and where the area of the background is. In some embodiment, the video fragments may participate in the multi-document summary the same way as other media elements described above, i.e. either as an associated text, or the actual video fragment inserted into the summary alongside other text, non-text, and media elements—or without them, leaving the summary constructed only of video elements.

In the foregoing a variety of non-limiting examples of approaches to implementing multi-document summarization are described. Those skilled in the art will readily recognize, in light of and in accordance with the teachings of the present invention that no particular definition of multi-document summarization, whether from research circles or industry-wide, is essential for search systems according to various embodiments of the present invention to operate. Therefore, in relation to this description, multi-document summarization is not a strict term, and rather generally refers to any compilation of text and/or other meaningful information from more than one source that attempts to deliver a coherent summary to the user. For example, an AI Language Model implemented via a neural network that learns from a multitude of individual sources of content from the Internet, or Intranet, or other repositories, creates a model based on such learning, and then generates an answer based on such model, may be considered a multi-document summarization system. Such neural network-based tools like OPENAI CHATGPT claim to provide "human-like abstractive summaries". Such tools pre-process the content from a multitude of individual sources, and learn to generate content according to a proprietary neural network model. Even though such summaries do not consist of piecemeal fragments of the content sources, but rather generate a summary based on the rules of the neural network that had processed them and learned from them, they fall under the scope of this invention. In view of the foregoing, it is clear that one skilled in the art may configure a summarization engine in light of the present invention that where the summary may be configured to include any other suitable media types in addition to text (e.g., images, multi-media, etc.); for example, without limitation, a description of an image file may be used to identify where would it best fit into the summary, alongside with text extracts from other documents.

In one embodiment, a search system may be combined with an Internet service such as, but not limited to, a travel site or a real estate office website to enable a user to obtain information about a hotel, restaurant, town, etc. In this embodiment the system performs a search for information on an object or a multitude of objects being researched, for example, without limitation, hotels, restaurants, real estate areas, attractions, etc. and creates a summary of relevant information from multiple sources such as, but not limited to, Wikipedia™, travel sites, newspapers, municipal records, tourists' reviews, etc. Various different types of Internet services may be incorporated into embodiments similar to this such as, but not limited to, retail sites, theater or entertainment rental sites, directories for local service providers, etc.

In an alternative embodiment, the system described above may be applied to an enterprise document workflow. Such enterprise systems may include a variety of documents stored in various repositories such as, without limitation, in multiple databases, on the intranet, on network shares, on standalone computers, etc. The documents may be in several different formats such as, without limitation, text (i.e. MICROSOFT Outlook™, MICROSOFT Word™, MICROSOFT Excel™, MICROSOFT PowerPoint™, etc.) or alternative media (i.e. images, sound recordings, visual presentations, etc.). The system may include a search across such repositories, summarizing the fragments of such documents into a coherent and useful summary for the users. As will be appreciated by one skilled in the art, internal (Intranet) repositories may be combined with external (Internet or external feeds) repositories when conducting a search. Such enterprise system-based summarization techniques may be used, for example, without limitation, for the summarization of emails on a topic of interest for the user, summarization of instant messages, summarization of voicemails, summarization of business requirements from various documents, production tickets stored in systems like JIRA, etc. For example, without limitation, an automatically generated presentation on a topic of "Software Development Costs Control" may include a coherent summary of email excerpts, MICROSOFT PowerPoint™ proposals, fragments of analysis documents in MICROSOFT Word™, sound clips from a speech on cost control by a CEO of the company, excerpts of user complaints from a production defects system, etc.

While a single search engine or database may be used to create a search summary, as will be appreciated by one skilled in the art, a combination of multiple different search engines, databases, and the like may be used to broaden the scope of a query. A user may select one or more different databases or search engines prior to, during, or after submitting a query. Subsequently, the results of the query from one or more databases or search engines may be summarized into a multi-document summarization and presented to the user as described above. When selecting multiple different databases or search engines, a user may be able to select additional options such as, but not limited to, counting the number of duplicate results, deleting duplicate results or performing other refinement or the summary like making it look like a coherent response, database or search engine prioritization of query results, excluding the low-ranked results from the summary, etc. For example, without limitation, if a user is managing multiple different email accounts, the user may be able to use a single query while selecting multiple different email servers, and create a multiple document search summarization of the results of the query to the multiple different email accounts. Additionally, offline databases may be able to be searched concurrently with online databases, allowing a user to create a customizable query while mixing results from multiple different databases.

In another embodiment, the system may be applied to specialized content areas where the structure of documents is predefined. Such specialized content areas may include, for example, without limitation, court cases and decisions, legal contracts, financial reports and filings, etc. In this case, the system may be used to parse the structure of each document, extract the pertinent portions of each document, and subsequently perform the summarization.

Some embodiments may be implemented with the ability to learn. In some of these embodiments, the system may learn through explicit feedback by analyzing feedback from the user. Some embodiments may also use automated feedback to tune itself or augments in its dictionaries based upon observing implicit metrics including, without limitation, how much time the user spent reading the summary or whether the user used the summary for further navigation and searches. It is contemplated that in some embodiments various different metrics such as, but not limited to, if the user prints or forwards the summary, if the user creates a shortcut to the summary or how many times the user views any videos or listens to any audio files in the summary, may be defined by various different implementations in which the system may learn automatically and tune its summary generation algorithms accordingly with or without human intervention.

In some embodiments, the query to the system may not be directly entered by the user, but implied by the system based on various considerations, including but not limited to, user preferences, user search history, an advertiser's preferences, a preconfigured query, or some default algorithm that the system implements. For example, without limitation, a summary on a certain topic may be generated on a scheduled basis and delivered to the user's email inbox. Similarly, such a summary may be generated on a scheduled basis and posted on a website, e.g., a blog, allowing multiple users to follow an ongoing development on the topic.

In other embodiments of the present invention, a variety of different means may be used when entering search queries, such as, without limitation, entering the search query using a keyboard, utilizing Voice to Text software, selecting previously entered queries, extracting a query from a text document, etc. Furthermore, multiple different means may be used to present query results and subsequent multiple-document summarizations to the user. A user may be able to select one or more formats for retrieving data from a query, such as, without limitation, a text file, an audio file (i.e., using Text to Speech conversion), a video file, etc.

In another embodiment of the present invention, a summary may be created interactively rather than fully automated. For example, without limitation, a user may optionally intervene at certain steps of the summary generation such as, but not limited to, choosing whether or not to include content from a certain document as a result, choosing whether or not to include a certain fragment from a certain document into the summary, manually inserting alternative document fragments, editing the text or media fragment before being included into the summary, manipulating summary-generating parameters (e.g. giving a preference to one parameter compared to another), etc. The user may also navigate back and forth through the summary that is being generated, thus participating in its creation and improvement. As a result, a further customized search summary using a semi-automated process may be produced that may be more in line with the needs of the user. In an example of the iterative creation of a summary, a user may be conversing or communicating with a multi-document summarization system implemented as a chatbot (e.g., OPENAI CHATGPT), passing instructions to the chatbot, receiving a response, providing additional instruction to the chatbot and/or indicating the level of satisfaction with the prior response, and so on. Parameters controlling the desired output can also be implemented, for example "Temperature" to control the quality or accuracy of the response; or "Coherence" to control the level of how well the parts of the summary fit together, as opposed to staying close to their original Web sources.

As will be appreciated by one skilled in the art, additional modifiers to search queries may be used to further customize the results of a query and produce more customizable search results. Text-based modifiers may include options to, for example, without limitation, restrict a search to include specific words or phrases, exclude results with specific words or phrases, etc. Additionally, web-site dependent search modifiers may be used, such as, without limitation, including only results from one or more web domain, excluding results from one or more web domains, prioritizing results based on more recent updates of a webpage, refining a search based on a specific file type, etc. A user may also refine a query based on language, region posted, media type, etc. While examples of query modifiers are listed above, as will be appreciated by one skilled, in the art, any such query modifier may be used to modify the results of a query, and query modifiers to be used in combination with multi-document summarization may not be limited to the query modifiers subsequently listed.

Figure 7:
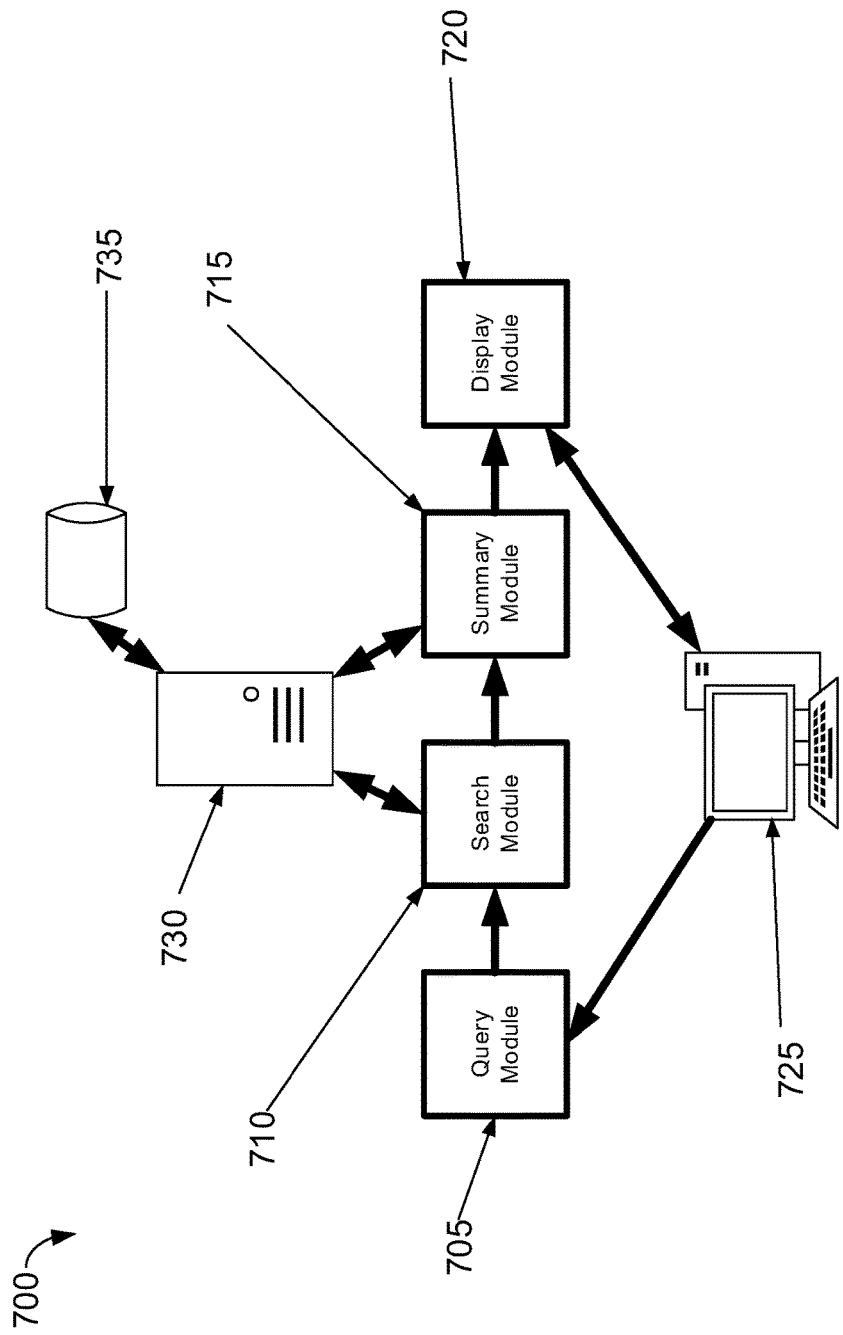
FIG. 7 illustrates the architecture of an exemplary system for metadata-based search summary creation, in accordance with an embodiment of the present invention.

FIG. 7 illustrates the architecture of an exemplary system for metadata-based search summary creation, in accordance with an embodiment of the present invention. Metadata-based search summary creation architecture 700 may comprise a query module 705, a search module 710, a summary module 715, and a display module 720. A query module 705 may have a means to receive user input such as, without limitation, a computer terminal 725, a keyboard, a touchpad, a mouse, a voice input device, or any device possessing computing capabilities within it such as, without limitation, a smartwatch, GOOGLE™ Glass, etc. A search module 710 may have a processing means such as, without limitation, a server 730, a computer platform, a smartphone device. The processing means of search module 710 may be further connected to one or more databases 735 which may contain entries and/or data relevant to any searches performed by search module 710. In the case of a neural network, databases 735 may comprise an AI Language model which is continuously retraining itself based on new sources fed into it. A summary module 715 may have a processing means such as, without limitation, server 730, a computer terminal, a mobile communication device which may process metadata associated with a user and/or any search results and create one or more search summaries. Search module 710 and summary module 715 may be implemented as one component rather than two separate ones, in case of a neural-network based embodiment, where the model itself decides which text elements to include and how to combine them into a response using its proprietary rules. A display module has a display means such as, without limitation, computer terminal 725, a computer monitor, speakers, TV screen, virtual reality mechanisms, "smart" devices like GOOGLE™ Glass or smartwatch, etc. For example, without limitation, OPENAI™ CHATGPT™ integrated with MICROSOFT BING™ search engine within MICROSOFT-MICROSOFT EDGE™ browser, or BARD integrated with GOOGLE™ Chrome browser can serve as an illustration of the process described on FIG. 7. It is understood that according to MICROSOFT™, generally, the AI-driven search engine would be able to give clear answers in plain language, synthesizing what BING found on the Web and in its own data vaults, rather than simply spitting out links to websites.

During a typical operation, a user may input a search query and metadata to be part of a search on a user input device such as computer terminal 725. The search query and metadata may be sent to a search module 710 which may include a server 730 to process the search query. One or more databases 735 are searched according to the search query and/or metadata sent to search module 710. A set of search results may be created and may be compiled with the metadata sent to search module 710. The compiled search results and metadata may then be sent to a summary module 715. Summary module 715 has a processing means such as server 730 and may create a summary of one or more search results. The summaries created by summary module 715 may also factor in the metadata received from search module 715 and create specialized summaries according to the metadata. Summaries may be sent to a display module 720 for display to a user. Display module 720 may receive user input from a user input device such as a computer terminal 725. User input may be used to control the summaries and/or any summary metadata displayed by display module 720. Display module 720 may format any summaries and/or summary metadata to accommodate virtually any means to relay information to a user such as, without limitation, hiding and/or highlighting sources, hiding and/or highlighting information, comparing multiple summaries, changing the font or any other formatting attributes of the summary, changing the language of the summary, including or excluding multimedia elements along with the text, amplifying or playing down multimedia elements, excluding duplicate or similar sentences or multimedia objects, or modify the sentences linguistically to make them read one after the other as a coherent text. Note that in case of a multi-document summarization system based on an AI Language Model, such refinement step is performed within the multi-document summarization system itself—by compiling coherent answer to the user's request.

It may be appreciated by a person with ordinary skill in the art, in light of and in accordance with the teachings of the present invention, that virtually any input device and method may be implemented by query module 705. Input devices and methods may be, without limitation, physical input from keyboards, audio input from microphones, visual input from cameras, and input from other applications that deduce or generate a query according to the logic they are programmed to. In another embodiment of the present invention, a user may vocally enter a search query by speaking into a microphone. In an alternative embodiment of the present invention, a user may visually enter a search query by signing a query in sign language to a video camera.

It may be appreciated by a person with ordinary skill in the art, in light of and in accordance with the teachings of the present invention, that virtually any type of metadata and/or data may be submitted with a search query and/or implemented during summary creation. Metadata and/or data may be, without limitation, user statistics, user rankings of previous search results, desired tone (e.g., conversational as opposed to formal) or sentiment of sources, desired length of sources, an author's viewpoint, an audience's preference or presumed viewpoint, source document format, etc. In another embodiment of the present invention, a search summary may be created with a specific tone. In yet another embodiment of the present invention, one or more search summaries may be created with different sources and/or viewpoints. In an alternative embodiment of the present invention, a user's profile may be used to determine the complexity of the language of a search summary.

It may be appreciated by a person with ordinary skill in the art, in light of and in accordance with the teachings of the present invention, that search summaries may have virtually any metadata associated to virtually any part of the search summary. Search summary metadata may include, without limitation, a tone of language of any line within a search summary, a source material for any line within a search summary, a value for language complexity, search query match metrics, author's viewpoint, the audience's preference or presumed viewpoint, source document format, ranking of sources, rating or degree of authority of the author, language of the source, etc.

It may be appreciated by a person with ordinary skill in the art, in light of and in accordance with the teachings of the present invention, that one or more modules may be embodied in one or more hardware devices. In another embodiment of the present invention, all the modules in metadata-based search summary creation architecture 700 may be located on one computing platform. In another embodiment of the present invention, metadata-based search summary creation architecture 700 may be embodied in a plurality of computing devices connected over a network.

Figure 8:
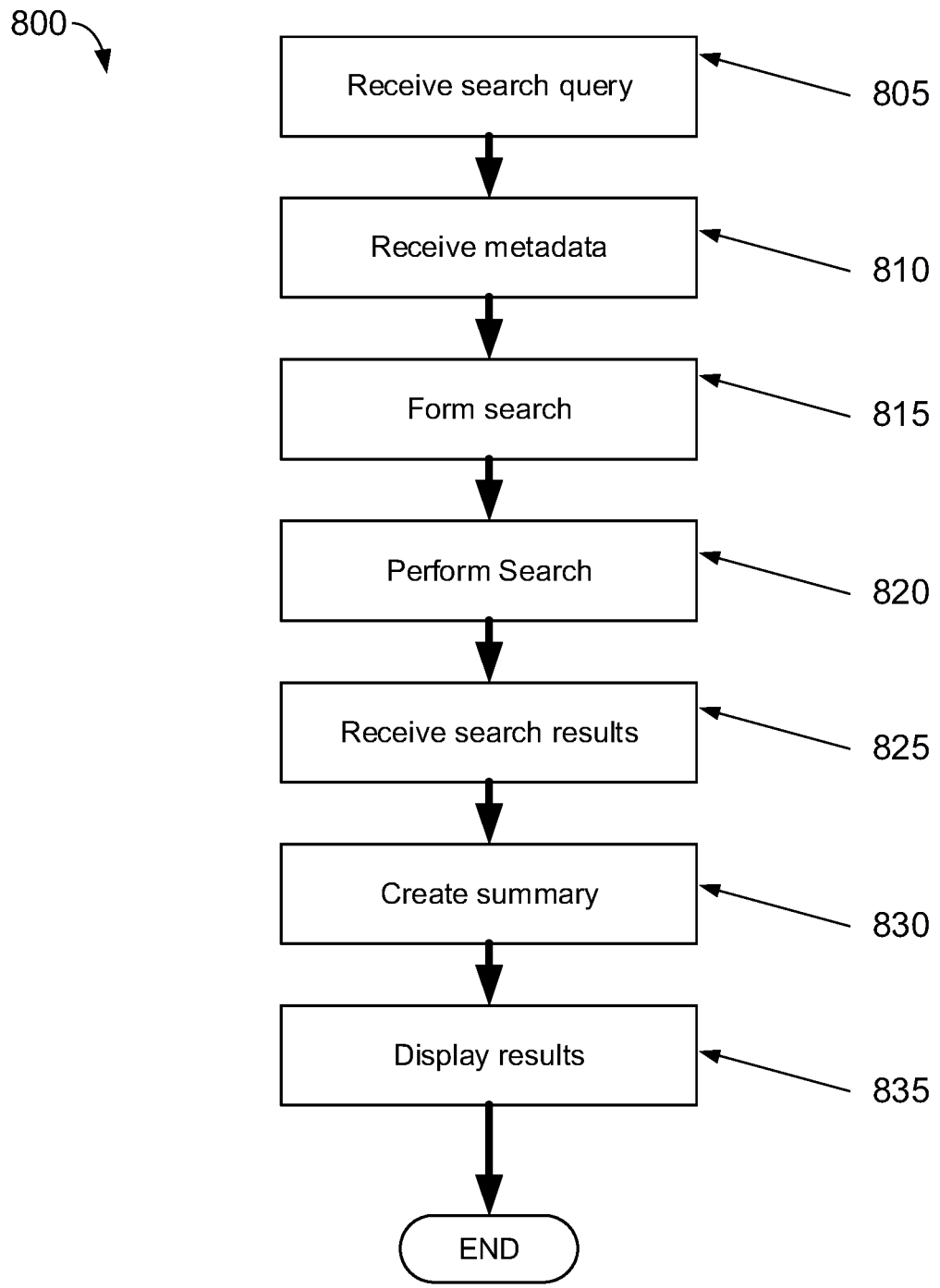
FIG. 8 is a flow chart illustrating an exemplary process for metadata-based search summary creation, in accordance with an embodiment of the present invention.

FIG. 8 is a flow chart illustrating an exemplary process for metadata-based search summary creation, in accordance with an embodiment of the present invention. A metadata-based search summary creation process 800 begins with a receive search query step 805. A user may enter a search query on an input device such as, without limitation, a computer terminal, microphone, keyboard, mouse, virtual reality equipment such as, without limitation, GOOGLE™ Glass or smartwatch, etc. A query may also come from another application, generated according to a particular logic of that application. A query may also be issued via sign language, or any other means known in the art. The search query may be received by a query module to be used for a search. A receive metadata step 810 may send search query related metadata to the query module. Search query related metadata may be virtually any data such as, without limitation, a user profile, prior search results and/or search summary rankings, a sentiment of the source, source language complexity, author's viewpoint, source document format, ranking of sources, rating or degree of authority of the author, human language of the source an input from another application, generated according to a particular logic of that application. A form search step 815 compiles the search query and any related metadata for searching. A perform search step 820 searches one or more databases with the search query and/or metadata. In a receive search results step 825, the search results from perform search step 820 are compiled for a search summary. A search summary may be created for one or more search results in a create summary step 830. The search summary may be created with tags and/or metadata that may be informative for the user. Tags and/or metadata may be, without limitation, a comparative rank of an author of a source, a sentiment implied by one or more sources in the search summary, a target audience for one or more sources, a level of profanity, a level of complexity, human language of the summary, digital rights to the media elements of the summary, etc. In a display results step 835, one or more search summaries may be displayed to a user by virtually any means such as, without limitation, audibly via speakers, visually on a monitor, printouts, via email or a message on a mobile communication device, via virtual reality equipment. A user may also input display commands on an input device such as a computer terminal. A user may also submit a rating, review, and/or metadata to be associated with a search and/or search summary for future searches.

It may be appreciated by a person with ordinary skill in the art, in light of and in accordance with the teachings of the present invention, that one or more search summaries may be created from a set of search results. Search summaries may be created for a combination or permutation of search queries and/or metadata related to a search. In another embodiment of the present invention, search results containing opposing viewpoints may result in one or more search summaries being generated for each viewpoint. In yet another embodiment of the present invention, a 'pro' and a 'con' search summary may be generated for a set of search results. Another example would be a request from a user to a multi-document summarization system implemented as a chatbot (e.g., OPENAI CHATGPT) to generate a State of the Union address as written and spoken by various historical figures or celebrities.

It may be appreciated by a person with ordinary skill in the art, in light of and in accordance with the teachings of the present invention, that a user may input virtually any display command in display results step 835. Display commands may include, without limitation, highlighting and/or hiding sources, displaying search summary tags and/or metadata, change the length of the summary, request translation into a different language, share the summary, rate the summary, redefine the query, refocus the query using some of the concepts from the summary, mark some sentences for removal, edit the summary, print the summary, save the summary, control the overlay of multimedia elements in the summary. In another embodiment of the present invention, a user may choose to hide all sources in a displayed search summary such that a search summary appears as a single coherent document. In an alternative embodiment of the present invention, a user may choose to sort search summaries according to tags such as language tone or complexity.

It may be appreciated by a person with ordinary skill in the art, in light of and in accordance with the teachings of the present invention, that one or more steps in metadata-based search summary creation process 800 may be added, removed, or rearranged. In some embodiments of the present invention, metadata-based search summary creation process 800 may omit the steps 805, 810, 815. In other embodiments of the present invention, the order of steps 805, 810, 815 in metadata-based search summary creation process 800 may occur in any order. In still other embodiments of the present invention, additional steps such as, but not limited to, parallel searches in multiple data stores or search engines, parallel creation of more than one summary, displaying results in more than one format, distributing results to more than one recipient, displaying results via more than one means at the same time, informing the user of the progress, may be added to metadata-based search summary creation process 800.

Figure 9:
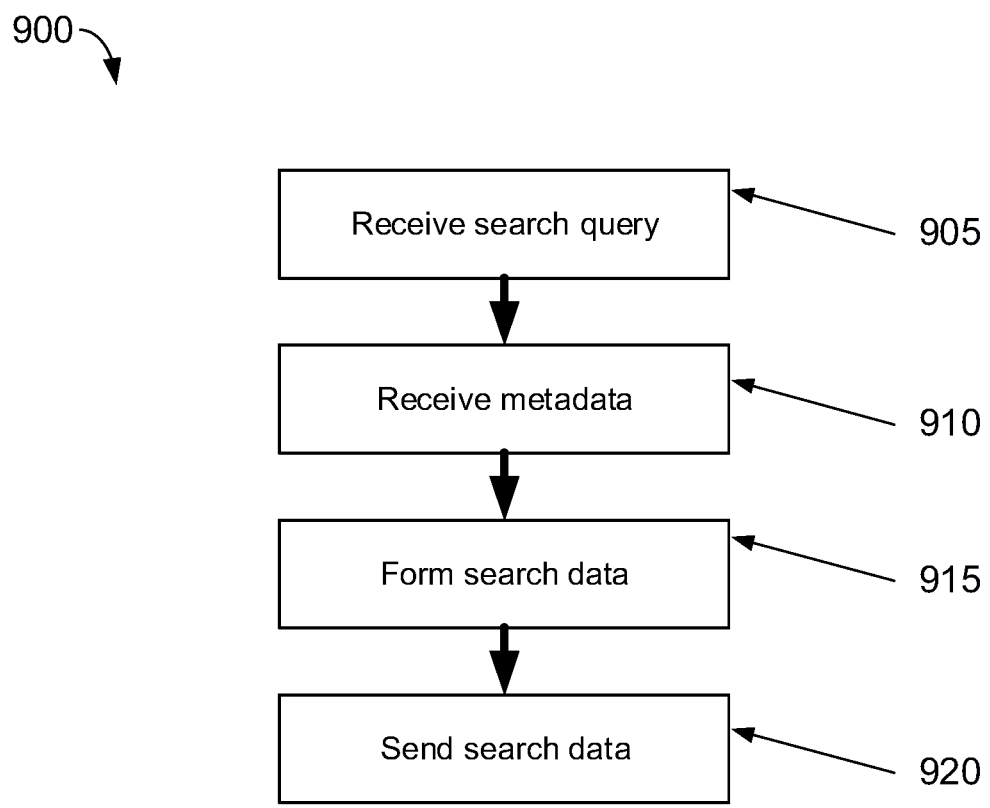
FIG. 9 is a flow chart illustrating an exemplary process for creating search queries on a query module, in accordance with an embodiment of the present invention.

FIG. 9 is a flow chart illustrating an exemplary process for creating search queries on a query module, in accordance with an embodiment of the present invention. A create search query process 900 begins with a receive search query in a step 905. A user inputs a search query on an input device such as, without limitation, a keyboard, microphone, keyboard, mouse, virtual reality equipment such as, without limitation, GOOGLE™ Glass or smartwatch. A query may also come from another application, generated according to a particular logic of that application. A query may also be issued via a sign language. A receive metadata in a step 910 receives metadata from a user such as, without limitation, a user profile, search tags, prior search ratings, user statistics, user rankings of previous search results, desired tone or sentiment of sources, desired length of sources, author's viewpoint, the audience's preference or presumed viewpoint, source document format. A form search data in a step 915 compiles the search query and metadata into search data. A send search data in a step 920 sends the compiled search data to a search module.

It may be appreciated by a person with ordinary skill in the art, in light of and in accordance with the teachings of the present invention, that a user may generate metadata. In another embodiment of the present invention, a user may rate a previous search result and/or summary by selecting a 'like' or 'dislike' button.

It may be appreciated by a person with ordinary skill in the art, in light of and in accordance with the teachings of the present invention, metadata in receive metadata in step 910 may be from virtually any source. Metadata may be from source such as, without limitation, other computing platforms, stored metadata on a non-transitory computer readable medium, data from networked sources, data generated by another application according to some logic used by that application. In another embodiment of the present invention, metadata may be user ratings of past search results and/or summaries stored on a non-transitory computer readable medium.

It may be appreciated by a person with ordinary skill in the art, in light of and in accordance with the teachings of the present invention, that one or more steps in create search query process 900 may be added, removed, or rearranged. In some embodiments of the present invention, create search query process 900 may omit the steps of 905, 910. In other embodiments of the present invention, the order of steps 905, 910, 915 in create search query process 900 may occur in any order. In still other embodiments of the present invention, additional steps such as, but not limited to, parallel searches in multiple data stores or search engines, parallel creation of more than one summary, displaying results in more than one format, distributing results to more than one recipient, displaying results via more than one means at the same time, informing the user of the progress may be added create search query process 900.

Figure 10:
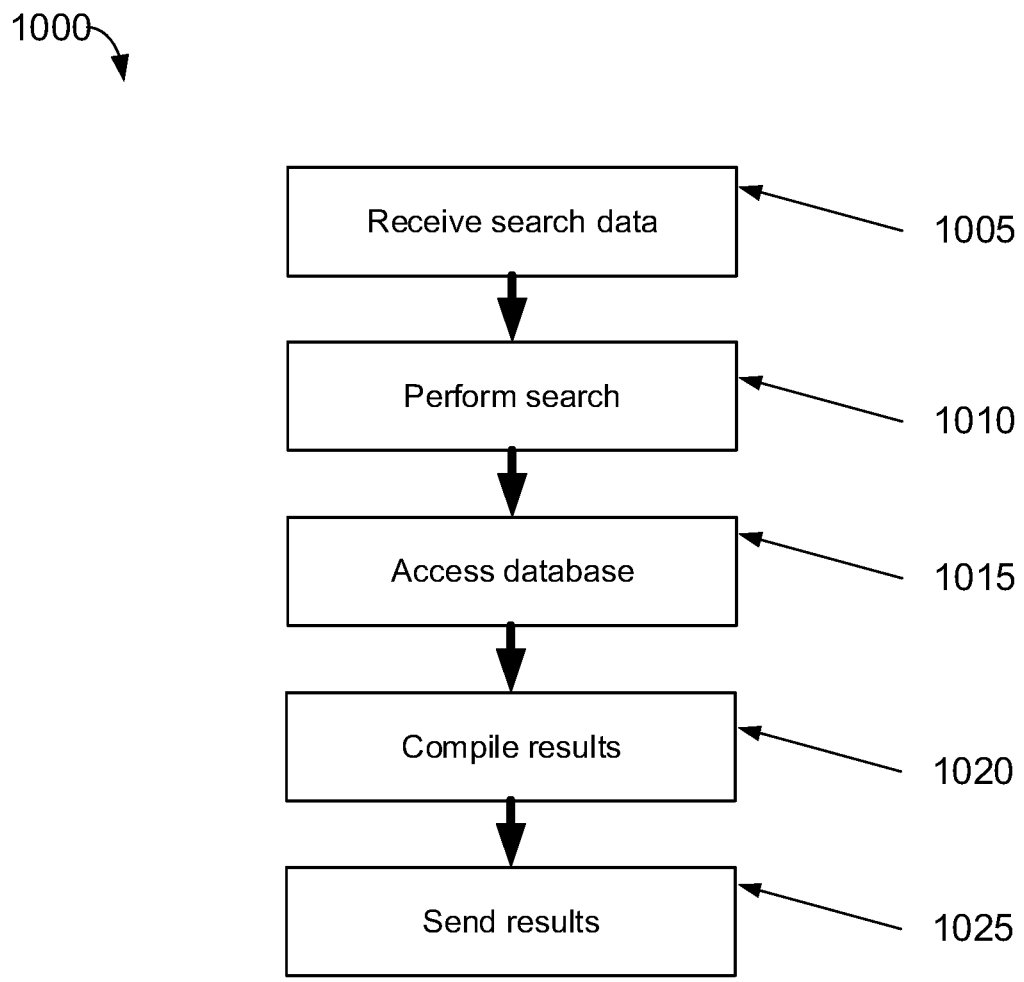
FIG. 10 is a flow chart illustrating an exemplary process for finding search results on a search module, in accordance with an embodiment of the present invention.

FIG. 10 is a flow chart illustrating an exemplary process for finding search results on a search module, in accordance with an embodiment of the present invention. A find search results process 1000 begins with a receive search data (query) in a step 1005. Search data is received from a query module and used by a processing means, such as a server, to perform a search. In a perform search in a step 1010, the processing means executes computer code and/or software from a non-transitory computer readable medium to perform a search according to the search query information and/or metadata provided in the search data. In an access database in a step 1015, the processing means may access one or more databases for matching entries that match and/or are relevant to the search data. Results from searching the one or more databases may be compiled with any metadata from the search data in a compile result in a step 1020. The compiled results may be sent to a summary module in a send result in a step 1025 for search summary creation.

It may be appreciated by a person with ordinary skill in the art, in light of and in accordance with the teachings of the present invention, that one or more steps in find search results process 1000 may be added, removed, or rearranged. In some embodiments of the present invention, find search results process 1000 may omit the steps of 1005, 1015. In other embodiments of the present invention, additional steps such as, but not limited to, parallel searches in multiple data stores or search engines, parallel creation of more than one summary, displaying results in more than one format, distributing results to more than one recipient, displaying results via more than one means at the same time, informing the user of the progress, may be added find search results process 1000.

Figure 11:
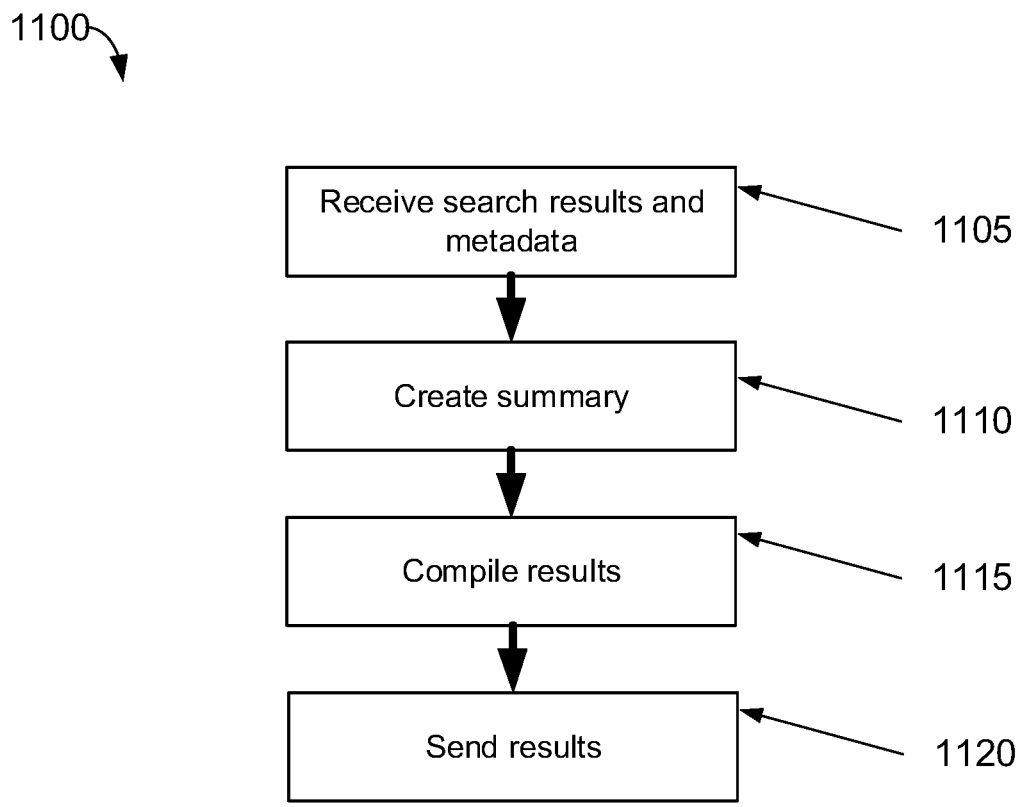
FIG. 11 is a flow chart illustrating an exemplary process for creating search summaries on a summary module, in accordance with an embodiment of the present invention.

FIG. 11 is a flow chart illustrating an exemplary process for creating search summaries on a summary module, in accordance with an embodiment of the present invention. A create search summary process 1100 begins with a receive search results and metadata in a step 1105. Compiled search results and/or metadata are received by the summary module and may be used to create one or more search summaries. In a create summary in a step 1110, a processing means, such as a server, may take one or more search results and create one or more search summaries. Search summaries may be created according to the material of the one or more search results and any metadata received in receive search results and metadata in step 1105. Search summary metadata may be formed in create summary in step 1110. Search summary metadata may be data describing the contents of a search summary and/or sources used in a search summary such as, without limitation, a comparative rank of an author of a source, a sentiment implied by one or more sources, a target audience for one or more sources and/or search summary, a general viewpoint of a search summary, a level of language complexity in a source and/or search summary, a level of profanity in a source and/or search summary, search query match metrics, author's viewpoint of a source, the audience's preference or presumed viewpoint, source document format, ranking of sources, human language of the source. One or more search summaries may be created for one or more sources in create summary in step 1110. A plurality of summaries may be created with each summary being assembled according to a factor such as, without limitation, viewpoint, language complexity, search results ranking, human language of the sources, relevance threshold of the sources to the query, human language of sources, desired balance between the text and multimedia elements of the summary, desired format of multimedia elements, length of the summary, authority of the source. In a compile result in a step 1115, search summaries, search summary metadata, and/or received metadata from receive search results and metadata in step 1105 may be compiled into a set of search results. The compiled results are sent to a display module for user viewing in a send result in a step 1120.

It may be appreciated by a person with ordinary skill in the art, in light of and in accordance with the teachings of the present invention, that one or more search summaries may be created for one or more search results according to virtually any factor in create summary in step 1110. Search summary creation factors may be, without limitation, target audience, opposing views of sources, tone, search metadata, language complexity, search results ranking, human language of the sources, relevance threshold of the sources to the query, human language of sources, desired balance between the text and multimedia elements of the summary, desired format of multimedia elements, length of the summary, authority of the source. In another embodiment of the present invention, a query on a debatable topic may result in two search summaries, a 'pro' summary and a 'con' summary, to be created.

It may be appreciated by a person with ordinary skill in the art, in light of and in accordance with the teachings of the present invention, that one or more steps in create search summary process 1100 may be added, removed, or rearranged. In other embodiments of the present invention, additional steps such as, but not limited to, saving summaries, sharing summaries, categorizing summaries, comparing with other summaries, ranking summaries, self-assessing the quality of the summary by the system and automatically regenerating the summary with adjusted criteria or a modified set of source data, may be added create search summary process 1100.

Figure 12:
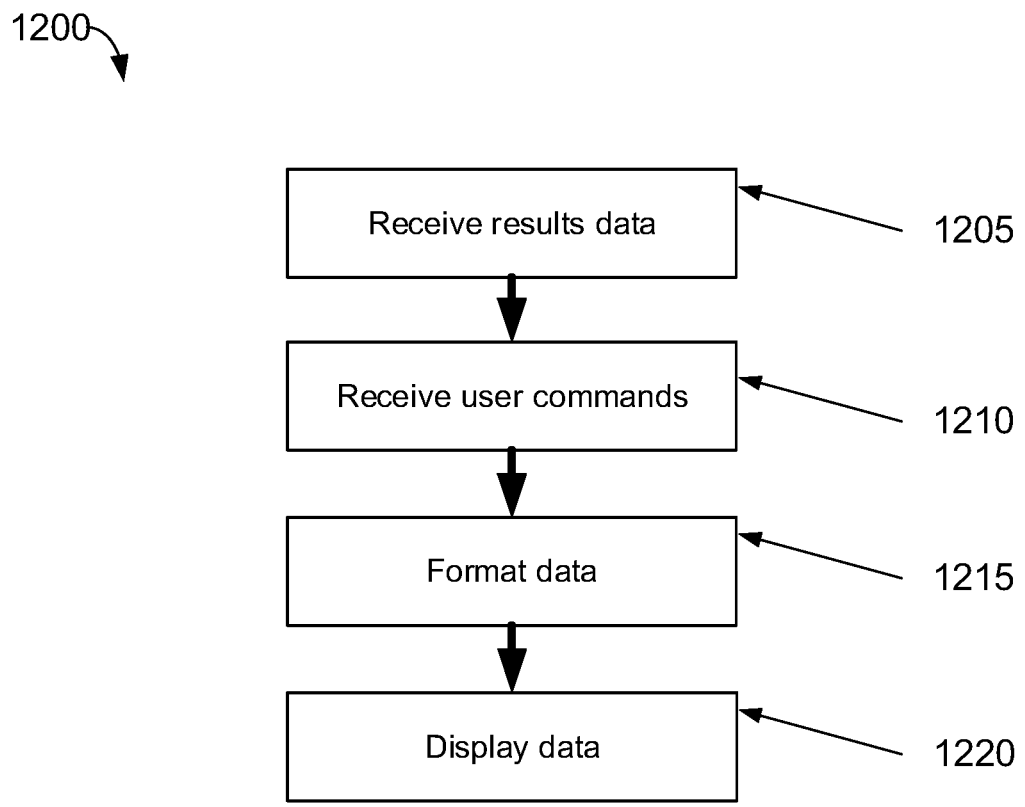
FIG. 12 is a flow chart illustrating an exemplary process for displaying results on a display module, in accordance with an embodiment of the present invention.

FIG. 12 is a flow chart illustrating an exemplary process for displaying results on a display module, in accordance with an embodiment of the present invention. A display data process 1200 begins with a receive results data in a step 1205. During receive results data in step 1205, a display module receives data from the summary module including, without limitation, one or more search summaries, summary metadata, result snippets or full sources. A user may input commands on an input device such as, without limitation, a keyboard, microphone, mouse, touchpad, virtual reality equipment. The received results data and user commands are used to format a display in a format data in a step 1215, wherein the data is converted, by a processing means such as a processor, for specific user interfaces such as, but not limited to, screens, speakers, printers, virtual reality equipment, emails, text and/or multimedia messages. A display data in a step 1220 presents the formatted data to a user through presentation means such as, but not limited to, screens, speakers, printers, virtual reality equipment, emails, text and/or multimedia messages.

It may be appreciated by a person with ordinary skill in the art, in light of and in accordance with the teachings of the present invention, that receive user commands in a step 1210 may receive virtually any command from a user. User commands may include, without limitation, hiding and/or highlighting search results and/or search summaries, displaying search summary metadata and/or tags, saving summary, printing summary, sharing summary via email or another communication mechanism, editing summary, refocusing the query of the summary, adjusting the length of the summary, ranking or rating the summary, voting for or against the summary (Like/Don't like), mark some sentences or elements of the summary for removal, controlling the inclusion of multimedia elements into the summary. In another embodiment of the present invention, a user may choose to hide sources such that all search summaries appear as one coherent document originating from one source. In an alternative embodiment of the present invention, a user may display search summaries with a specific tag and/or tone of language.

It may be appreciated by a person with ordinary skill in the art, in light of and in accordance with the teachings of the present invention, that format data in step 1215 may format data intended for a user for virtually any device. Format data in step 1215 may format data for devices such as, but not limited to, smartphones, computer monitors, televisions, stereoscopic displays, listening devices, printers, emails, text or multimedia messages, smart devices such as, but not limited to GOOGLE™ Glass or smartwatch, virtual reality equipment. In another embodiment of the present invention, data intended for a user may be converted to a sound file and audibly played to a user.

Figure 13:
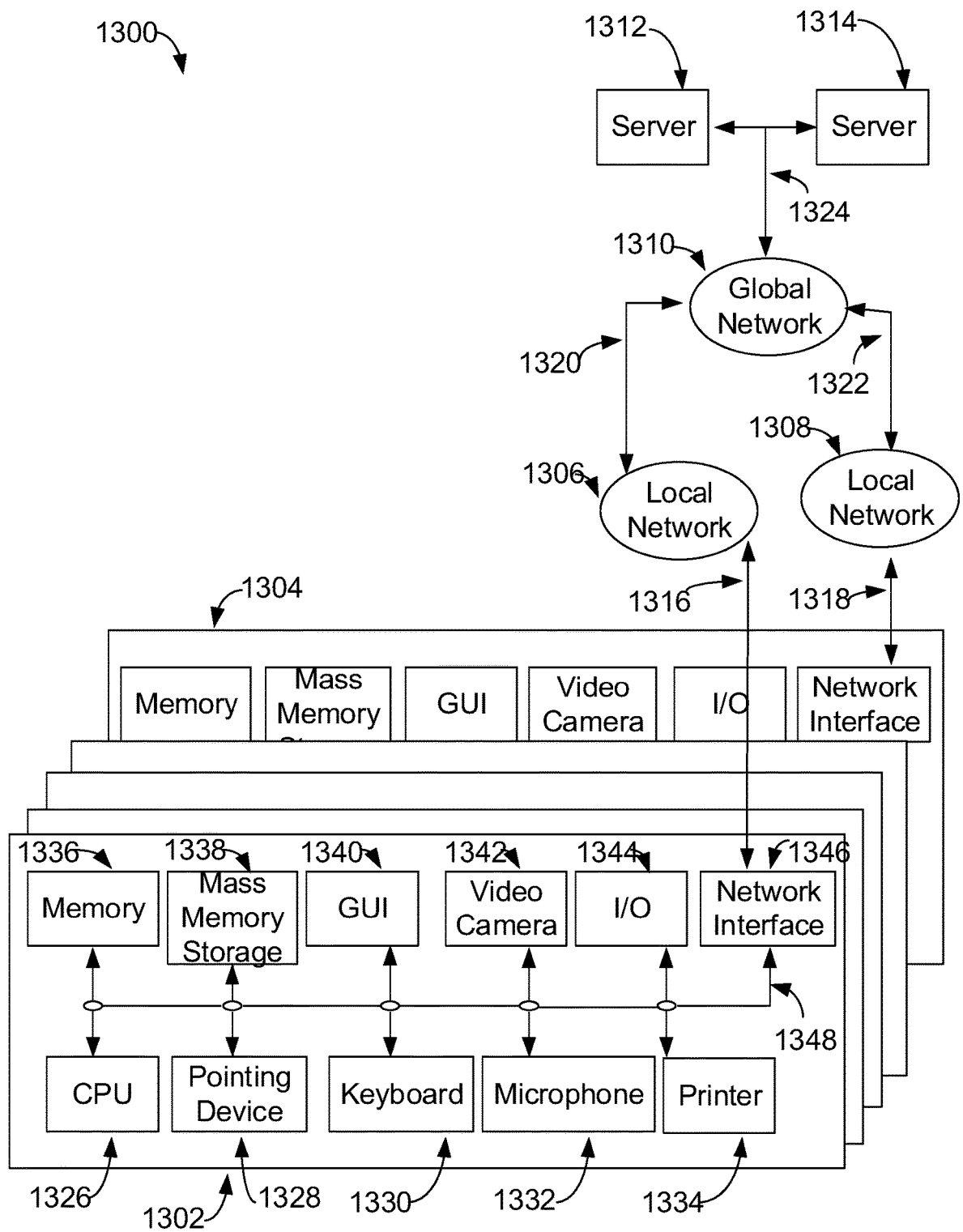
FIG. 13 is a block diagram depicting an exemplary client/server system which may be used by an exemplary web-enabled/networked embodiment of the present invention.

FIG. 13 is a block diagram depicting an exemplary client/server system which may be used by an exemplary web-enabled/networked embodiment of the present invention.

A communication system 1300 includes a multiplicity of clients with a sampling of clients denoted as a client 1302 and a client 1304, a multiplicity of local networks with a sampling of networks denoted as a local network 1306 and a local network 1308, a global network 1310 and a multiplicity of servers with a sampling of servers denoted as a server 1312 and a server 1314.

Client 1302 may communicate bi-directionally with local network 1306 via a communication channel 1316. Client 1304 may communicate bi-directionally with local network 1308 via a communication channel 1318. Local network 1306 may communicate bi-directionally with global network 1310 via a communication channel 1320. Local network 1308 may communicate bi-directionally with global network 1310 via a communication channel 1322. Global network 1310 may communicate bi-directionally with server 1312 and server 1314 via a communication channel 1324. Server 1312 and server 1314 may communicate bi-directionally with each other via communication channel 1324. Furthermore, clients 1302, 1304, local networks 1306, 1308, global network 1310 and servers 1312, 1314 may each communicate bi-directionally with each other.

In one embodiment, global network 1310 may operate as the Internet. It will be understood by those skilled in the art that communication system 1300 may take many different forms. Non-limiting examples of forms for communication system 1300 include local area networks (LANs), wide area networks (WANs), wired telephone networks, wireless networks, or any other network supporting data communication between respective entities.

Clients 1302 and 1304 may take many different forms. Non-limiting examples of clients 1302 and 1304 include personal computers, personal digital assistants (PDAs), cellular phones and smartphones.

Client 1302 includes a CPU 1326, a pointing device 1328, a keyboard 1330, a microphone 1332, a printer 1334, a memory 1336, a mass memory storage 1338, a GUI 1340, a video camera 1342, an input/output interface 1344, and a network interface 1346.

CPU 1326, pointing device 1328, keyboard 1330, microphone 1332, printer 1334, memory 1336, mass memory storage 1338, GUI 1340, video camera 1342, input/output interface 1344 and network interface 1346 may communicate in a unidirectional manner or a bi-directional manner with each other via a communication channel 1348. Communication channel 1348 may be configured as a single communication channel or a multiplicity of communication channels.

CPU 1326 may be comprised of a single processor or multiple processors. CPU 1326 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors.

As is well known in the art, memory 1336 is used typically to transfer data and instructions to CPU 1326 in a bi-directional manner. Memory 1336, as discussed previously, may include any suitable computer-readable media, intended for data storage, such as those described above excluding any wired or wireless transmissions unless specifically noted. Mass memory storage 1338 may also be coupled bi-directionally to CPU 1326 and provides additional data storage capacity and may include any of the computer-readable media described above. Mass memory storage 1338 may be used to store programs, data and the like and is typically a secondary storage medium such as a hard disk. It will be appreciated that the information retained within mass memory storage 1338, may, in appropriate cases, be incorporated in standard fashion as part of memory 1336 as virtual memory.

CPU 1326 may be coupled to GUI 1340. GUI 1340 enables a user to view the operation of computer operating system and software. CPU 1326 may be coupled to pointing device 1328. Non-limiting examples of pointing device 1328 include computer mouse, trackball, and touchpad. Pointing device 1328 enables a user with the capability to maneuver a computer cursor about the viewing area of GUI 1340 and select areas or features in the viewing area of GUI 1340. CPU 1326 may be coupled to keyboard 1330. Keyboard 1330 enables a user with the capability to input alphanumeric textual information to CPU 1326. CPU 1326 may be coupled to microphone 1332. Microphone 1332 enables audio produced by a user to be recorded, processed and communicated by CPU 1326. CPU 1326 may be connected to printer 1334. Printer 1334 enables a user with the capability to print information to a sheet of paper. CPU 1326 may be connected to video camera 1342. Video camera 1342 enables video produced or captured by user to be recorded, processed, and communicated by CPU 1326.

CPU 1326 may also be coupled to input/output interface 1344 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1326 optionally may be coupled to network interface 1346 which enables communication with an external device such as a database or a computer or telecommunications or internet network using an external connection shown generally as communication channel 1316, which may be implemented as a hardwired or wireless communications link using suitable conventional technologies. With such a connection, CPU 1326 might receive information from the network, or might output information to a network in the course of performing the method steps described in the teachings of the present invention.

Figure 14:
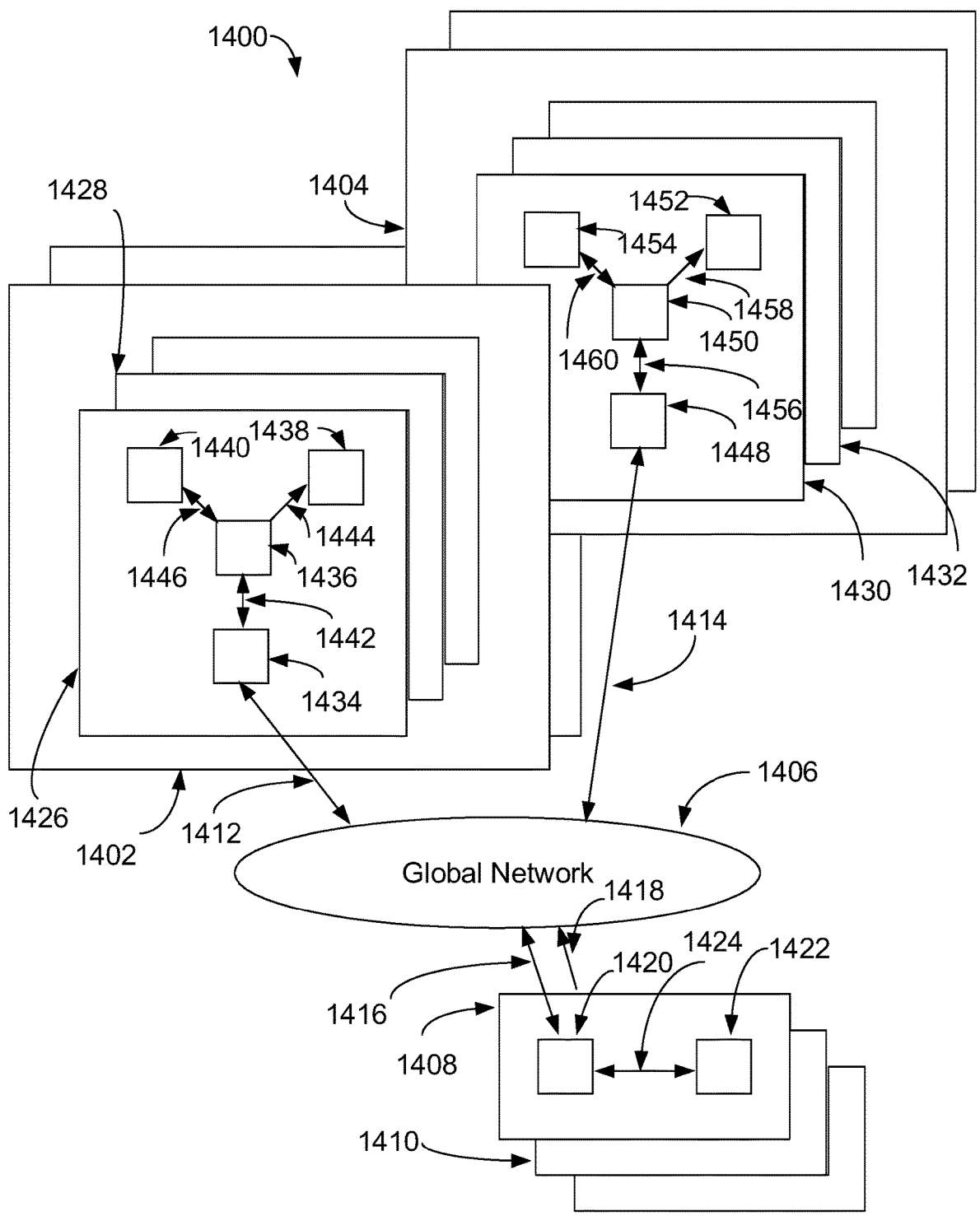
FIG. 14 illustrates a block diagram depicting a conventional client/server communication system.

FIG. 14 illustrates a block diagram depicting a conventional client/server communication system.

A communication system 1400 includes a multiplicity of networked regions with a sampling of regions denoted as a network region 1402 and a network region 1404, a global network 1406 and a multiplicity of servers with a sampling of servers denoted as a server device 1408 and a server device 1410.

Network region 1402 and network region 1404 may operate to represent a network contained within a geographical area or region. Non-limiting examples of representations for the geographical areas for the networked regions may include postal zip codes, telephone area codes, states, counties, cities and countries. Elements within network region 1402 and 1404 may operate to communicate with external elements within other networked regions or within elements contained within the same network region.

In some implementations, global network 1406 may operate as the Internet. It will be understood by those skilled in the art that communication system 1400 may take many different forms. Non-limiting examples of forms for communication system 1400 include local area networks (LANs), wide area networks (WANs), wired telephone networks, cellular telephone networks or any other network supporting data communication between respective entities via hardwired or wireless communication networks. Global network 1406 may operate to transfer information between the various networked elements.

Server device 1408 and server device 1410 may operate to execute software instructions, store information, support database operations and communicate with other networked elements. Non-limiting examples of software and scripting languages which may be executed on server device 1408 and server device 1410 include C, C++, C # and Java.

Network region 1402 may operate to communicate bi-directionally with global network 1406 via a communication channel 1412. Network region 1404 may operate to communicate bi-directionally with global network 1406 via a communication channel 1414. Server device 1408 may operate to communicate bi-directionally with global network 1406 via a communication channel 1416. Server device 1410 may operate to communicate bi-directionally with global network 1406 via a communication channel 1418. Network region 1402 and 1404, global network 1406 and server devices 1408 and 1410 may operate to communicate with each other and with every other networked device located within communication system 1400.

Server device 1408 includes a networking device 1420 and a server 1422. Networking device 1420 may operate to communicate bi-directionally with global network 1406 via communication channel 1416 and with server 1422 via a communication channel 1424. Server 1422 may operate to execute software instructions and store information.

Network region 1402 includes a multiplicity of clients with a sampling denoted as a client 1426 and a client 1428. Client 1426 includes a networking device 1434, a processor 1436, a GUI 1438 and an interface device 1440. Non-limiting examples of devices for GUI 1438 include monitors, televisions, cellular telephones, smartphones, and PDAs (Personal Digital Assistants). Non-limiting examples of interface device 1440 include pointing device, mouse, trackball, scanner, and printer. Networking device 1434 may communicate bi-directionally with global network 1406 via communication channel 1412 and with processor 1436 via a communication channel 1442. GUI 1438 may receive information from processor 1436 via a communication channel 1444 for presentation to a user for viewing. Interface device 1440 may operate to send control information to processor 1436 and to receive information from processor 1436 via a communication channel 1446. Network region 1404 includes a multiplicity of clients with a sampling denoted as a client 1430 and a client 1432. Client 1430 includes a networking device 1448, a processor 1450, a GUI 1452 and an interface device 1454. Non-limiting examples of devices for GUI 1438 include monitors, televisions, cellular telephones, smartphones and PDAs (Personal Digital Assistants). Non-limiting examples of interface device 1440 include pointing devices, mouses, trackballs, scanners and printers. Networking device 1448 may communicate bi-directionally with global network 1406 via communication channel 1414 and with processor 1450 via a communication channel 1456. GUI 1452 may receive information from processor 1450 via a communication channel 1458 for presentation to a user for viewing. Interface device 1454 may operate to send control information to processor 1450 and to receive information from processor 1450 via a communication channel 1460.

For example, consider the case where a user interfacing with client 1426 may want to execute a networked application. A user may enter the IP (Internet Protocol) address for the networked application using interface device 1440. The IP address information may be communicated to processor 1436 via communication channel 1446. Processor 1436 may then communicate the IP address information to networking device 1434 via communication channel 1442. Networking device 1434 may then communicate the IP address information to global network 1406 via communication channel 1412. Global network 1406 may then communicate the IP address information to networking device 1420 of server device 1408 via communication channel 1416. Networking device 1420 may then communicate the IP address information to server 1422 via communication channel 1424. Server 1422 may receive the IP address information and after processing the IP address information may communicate return information to networking device 1420 via communication channel 1424. Networking device 1420 may communicate the return information to global network 1406 via communication channel 1416. Global network 1406 may communicate the return information to networking device 1434 via communication channel 1412. Networking device 1434 may communicate the return information to processor 1436 via communication channel 1442. Processor 1446 may communicate the return information to GUI 1438 via communication channel 1444. User may then view the return information on GUI 1438.

In some embodiments, the five basic components of artificial intelligence (AI) may include learning, reasoning, problem-solving, perception, and language understanding. An AI Language model may analyze bodies of text data to provide a basis for word predictions. The model may use natural language processing (NLP) search queries, and generate text as a learned output through machine translation and/or question answering.

Figure 15:
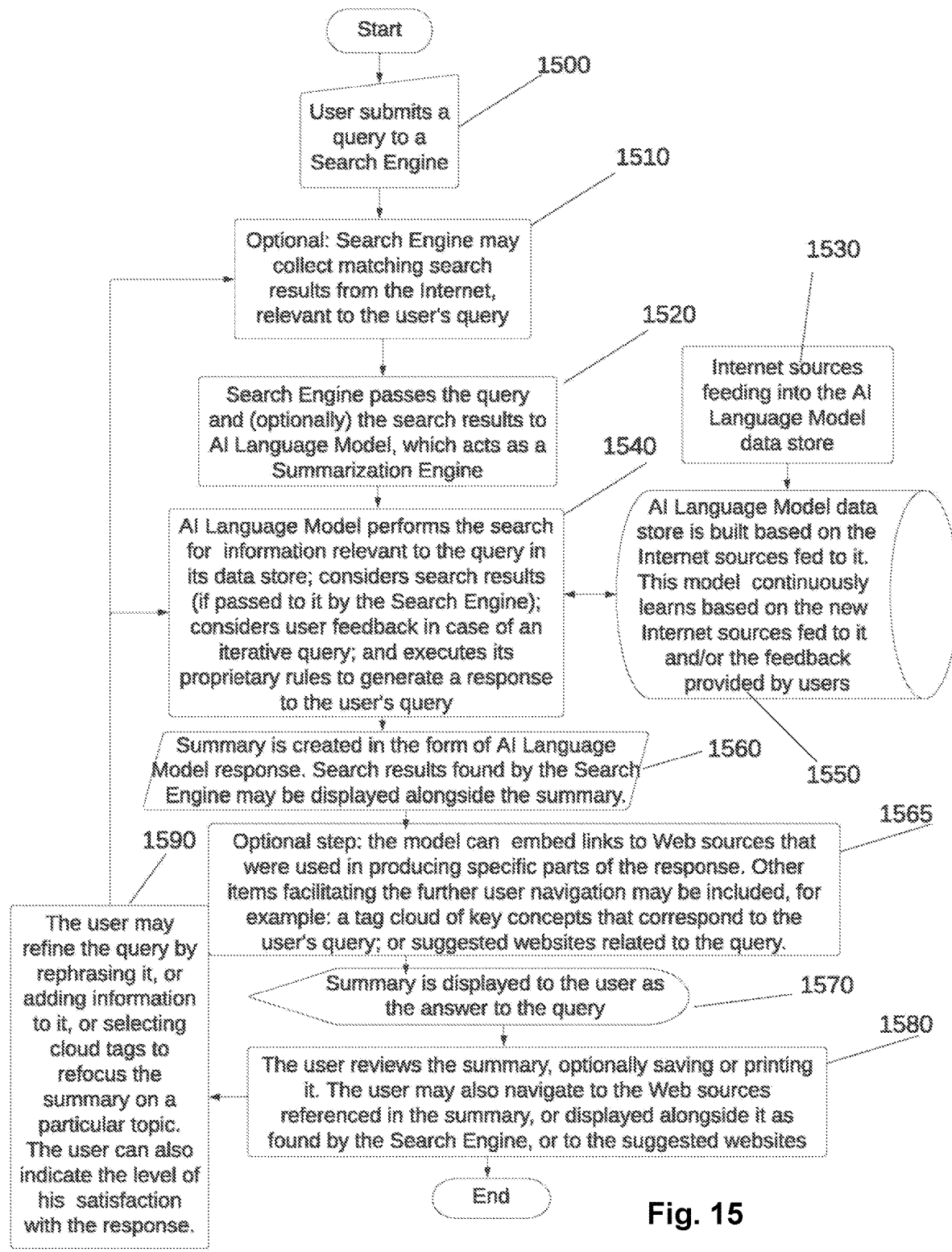
FIG. 15 is a flowchart illustrating an exemplary process for the interaction between a search engine and a multi-document summarization engine based on an AI Language Model, in accordance with some embodiments of the present invention.

FIG. 15 is a flowchart illustrating an exemplary process for the interaction between a search engine and a multi-document summarization engine based on an AI Language Model (similar to the OPENAI CHATGPT), in accordance with an embodiment of the present invention.

Figure 16:
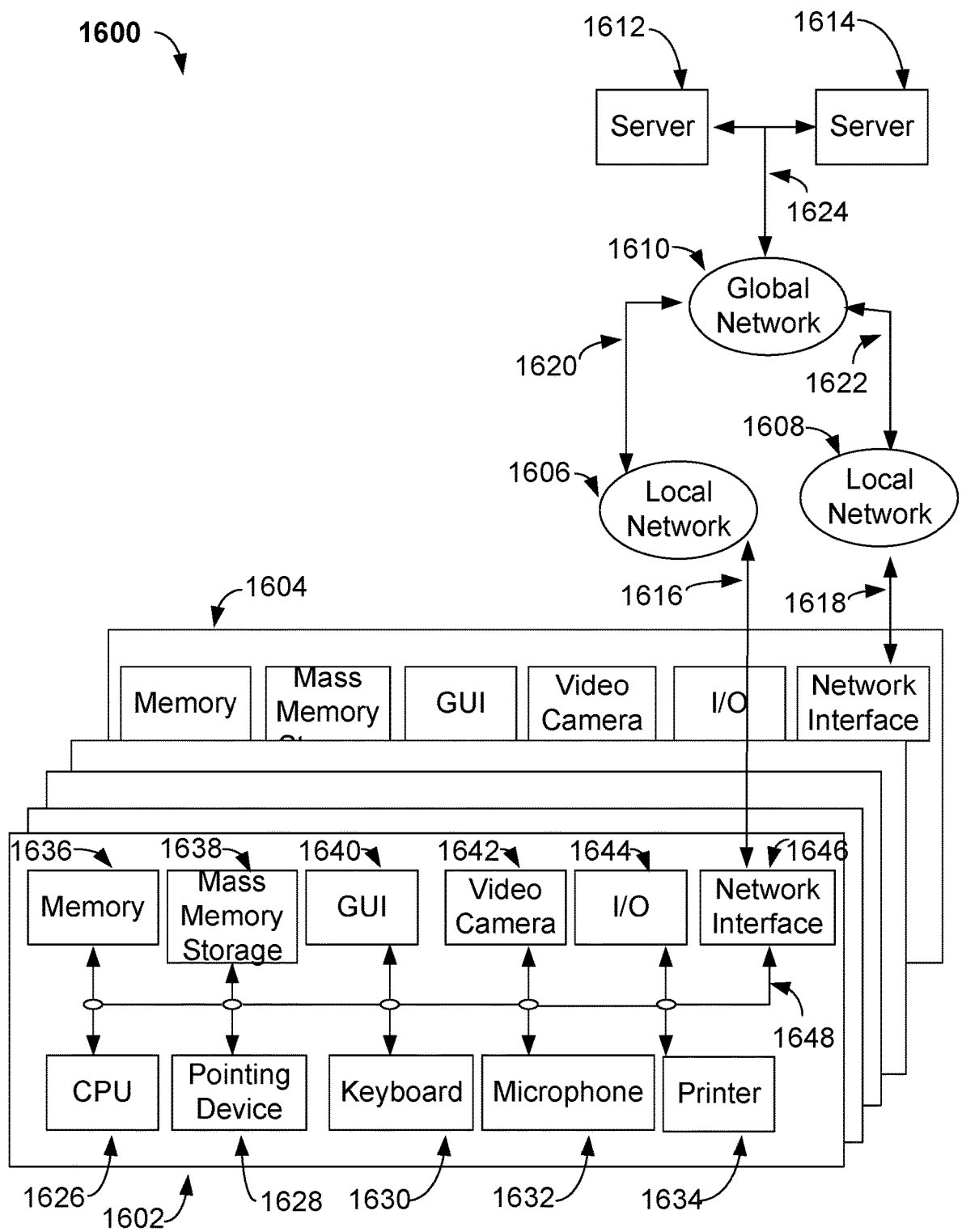
FIG. 16 is a block diagram depicting an exemplary client/server system which may be used by an exemplary web-enabled/networked embodiment, in accordance with various embodiment of the present invention.
Figure 17:
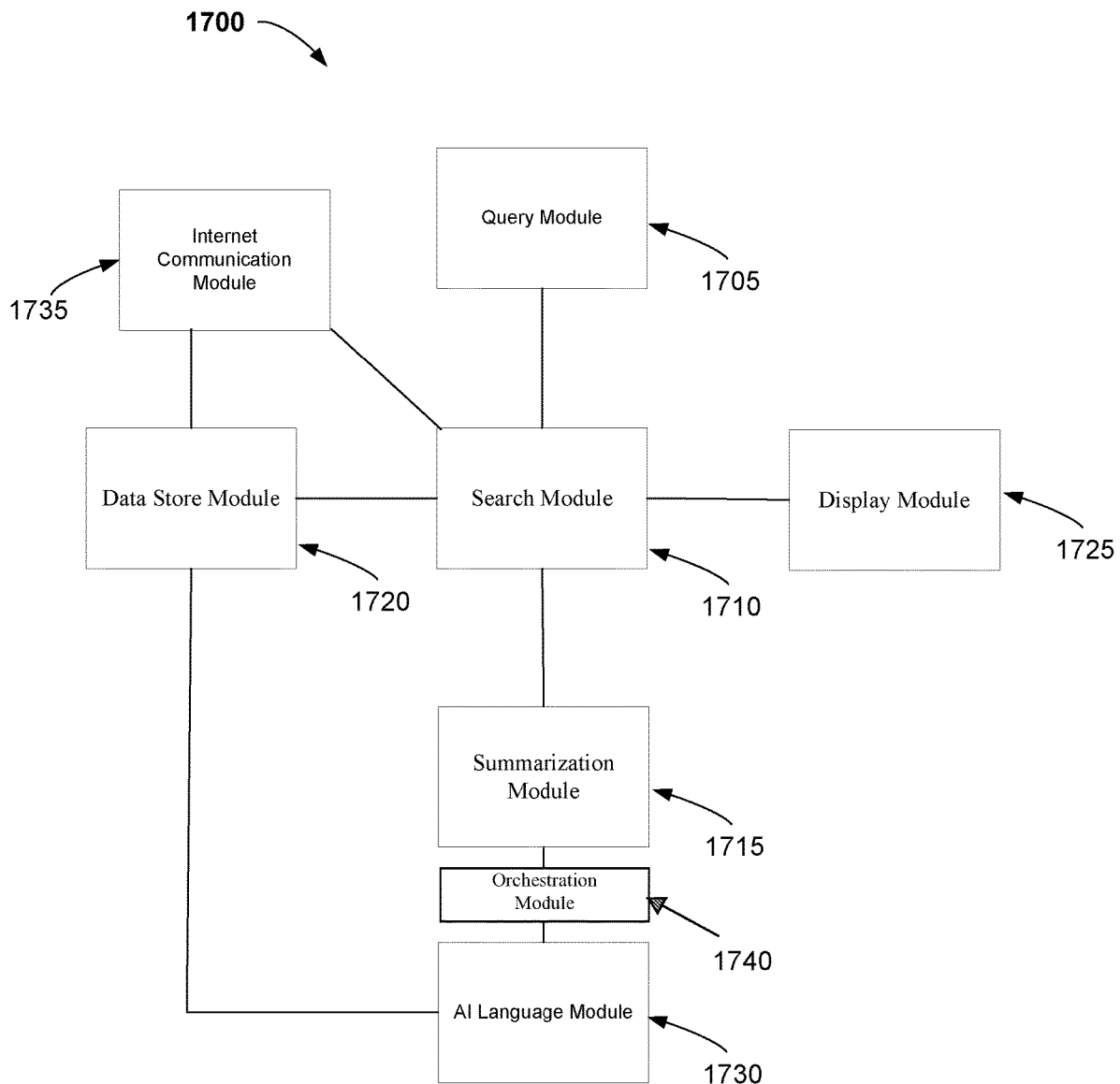
FIG. 17 illustrates a block diagram of an exemplary system for the interaction between a search engine and a multi-document summarization engine based on an AI Language Model, in accordance with an embodiment of the present invention.

Referring to FIGS. 15, 16 and 17, the process begins at a step 1500 wherein a user submits a query using a Query Module 1705 within client computing device 1602. In a step 1510 search engine 1710 may perform a search on the Internet 1610 or an Intranet/enterprise network/Local Area Network (LAN) 1606; or retrieved from a database 1720 or a computer file; or generated by a computer program based on some algorithm and may identify a plurality or set of matching documents relevant to the query. Search results may be in the form of documents (or files) containing text, in any format or in the form of fragments of text. The text has the natural language structure and may be free-form. The documents may be in any file format readable by the system. The language of the text may not be specified and may be in any human language. The language of different documents may be the same or different.

In a step 1520, processing means 1612 may pass the search results and the query to a multi-document summarization engine 1715. (Note that step 1510 may be skipped if the user's query is sent directly to the multi-document summarization engine, bypassing the collection of new information sources from the Internet.) The user may optionally pass parameters that control the way an AI Language Model 1730 operates. The AI Language model analyzes bodies of text data to provide a basis for word predictions. The model may use natural language processing (NLP) search queries, and generate text as an output through machine translation and/or question answering. For example, in the case of CHATGPT, Temperature parameter may be passed to control the level of randomness or "creativity" in the generated text. Higher Temperature values result in more diverse but less predictable output. Conversely, lower temperatures result in more focused and predictable output. Other parameters may include the length of the requested response, or the format of the response, etc. In some embodiment, the search query may be analyzed by the system using NLP or metadata or other means, in order to affect the calculation of relevance scores, thus focusing the summary on the topic specified by the query. If the system is unable to use the query, it should generate a summary without focusing on a particular topic. The relevance score of each sentence may be calculated by the system. The score may or may not be displayed by the system to the user; may or may not be used by the system for learning. The language of the documents may be specified to the summarization engine, or automatically identified by the search engine. The system may be able to process one language, or a variety of languages. The system may skip a document if it cannot understand its language.

Referring to FIGS. 15 and 17, In a step 1540, multi-document summarization engine 1715 implemented via the AI Language Model 1730 may perform a multi-document summarization of the results, identifying key concepts in each document, and producing a text summary representing a digest of the search results. The summary may consist of key semantic concepts; or of text fragments or sentences matching those concepts; or a combination of the two. The AI Language Model performs the search for information relevant to the query in data store 1720; considers search results (if passed to it by the Search Engine); considers user feedback in case of an iterative query; and executes its proprietary rules to generate a response to the user's query. The multi-document summarization algorithm or engine is capable of natural language processing (for example, the engine is integrated with AI Language Module 1730), identifying key semantic concepts and/or text fragments, and scoring them by relevance or other factors, where multi-document summarization engine 1715 may detect that some text fragments coming from different sources are either identical, or substantially similar in terms of the content they contain. In this case, such duplicate or substantially similar text fragments may be merged into one text fragment. All sources that have contributed to such text fragments may be referenced in the search summary. In other embodiments, the summarization algorithm may consider document structure; document format; metatags; or any other type of data associated with the search results, to use while identifying and scoring key semantic concepts and/or text fragments. In other embodiments, the summary may comprise of key semantic concepts and/or text fragments organized in the order of decreasing relevance (score). The position of a particular sentence on its source page may be taken into account as well, although the relevance is more important. The summarization engine may have a limit on the number of documents to process for a summary. The limit may be passed to the system as a parameter or configured as a default.

Referring to FIGS. 15, 16 and 17, in a step 1550, multi-document summarization engine 1715 interacts with data store, which is a module 1720 that receives data from Internet 1610 (step 1530) through Internet Communication Module 1735, applies proprietary learning mechanisms to the data, and continuously updates AI Language Model 1730 that is able to generate content in response to a query. AI Language Model data store 1720 is built based on the Internet data sources fed to it. The AI Language Model continuously learns based on the new Internet data sources fed to the model and/or the feedback provided by users. Step 1540 may also consider user feedback as an input to the AI Language Model, to facilitate continuous learning and improvement of the results.

In a step 1560, the summary may be returned to a program product component or system core that controls the interaction between the search engine and the summarization engine including receiving search results from the search engine; passing a specified number of those results (for example, top ten results) to the summarization engine; receiving back the summary; and passing it back to the user. In addition, a search summary may be created in the form of an AI Language Model response. Search results that were found by the Search Engine in step 1510 may be displayed alongside the summary. In an optional step 1565, as referred to herein, the model may embed links referring back to suitable or potential, yet not necessarily the original, Web documents that are highly related and/or highly likely to be the sources, used in producing specific parts of the response. For example, without limitation, in applications employing LLMs such as CHATGPT™, which have no way to link back to supporting source documents, the system may perform a reverse web search on concepts and/or word fragments to find and display suitable link to supporting web page(s) as potential citations, which may be a single best match document link or a list of high-ranking candidates. In addition, step 1565 may enrich the summary in other ways, for example, listing suggested websites that are related to the user's query or the model may embed links to Web sources that were used in producing specific parts of the response; or displaying a tag cloud of key concepts identified in the data/documents that were used in the construction of the summary. Such tags may be made clickable, allowing to refocus the summary to a corresponding topic in a step 1590. The user may refine the query by rephrasing the query, or adding information to the query, or selecting cloud tags to refocus the summary on a particular topic. The user may indicate the level of satisfaction with the response. In some embodiment, the search engine uses dictionaries of words or phrases which are characteristic for a particular information domain, as well as those that are not characteristic, allowing the summarization engine to adjust its algorithm to better suit this particular domain. The dictionaries may be static; or dynamically populated by users or administrators; or accumulated by the system itself through its learning features. In other embodiments, clustering of semantic concepts extracted from search results may be performed. Concepts close to each other as perceived by the system, are clustered together. A hierarchy of concepts and/or clusters may be created by the system.

Referring to FIGS. 15, 16 and 17, in a step 1570, system core or client computer 1602 may display the summary to the user as an answer to the query on an exemplary GUI 1640. In a step 1580, the user may save or print the summary to a printer 1634, or navigate to the suggested websites. If the user is satisfied with the summary, the process ends. If the user wishes, the user may refine the query by rephrasing it, or providing additional information in a step 1580. The user may also navigate to the Web sources referenced in the summary, or displayed alongside it as found by the Search Engine, or to the suggested websites. The user may select cloud tags if the results were returned along with the summary, indicating to summarization engine 1715 that the summary should refocus to the corresponding topic. The user may indicate a level of satisfaction with the response from the system in step 1580, or specify other parameters that impact AI Language Model 1730 output. The system may then return to either step 1510 to collect additional sources by the search engine, or to step 1540 to perform the multi-document summarization again using the refined query and optionally the level of satisfaction with prior response. In some embodiment, the user is able to navigate to any desired source document directly from the summary, akin to bibliographical reference, by clicking on a hyperlink for that source. The semantic concepts extracted by the summarization engine are displayed to the user, in a form of a list, or a cluster hierarchy, or a tag cloud, or in other form. The user may be able to use the presentation of the concepts to refine the query; or to navigate to certain parts of the summary; or to modify or regroup the contents of the summary, by selecting or unselecting certain clusters or concepts. In other embodiments, the user may specify the language of the query, the user may select manually which search results to include in the summary, in addition to the option of including all results, the user may specify the desired length of the summary, expressed either in the number of sentences; or as a percentage to the overall size of text of the sources; or through another measure, the user may specify a way the sources are displayed in the summary, for example: cite a source after each sentence; or cite a source after a group of sentences coming from that source; or not cite the sources at all; or in another way. A relevance score of each text fragment or each concept extracted by the summarization engine may be displayed to the user, or returned to the application that called the system. The user may rate the summaries based on quality or satisfaction; or rate individual text fragments or concepts; or rate the documents returned by the search engine. The rating may be communicated back to the system, and may be used by the system for learning. Users may share summaries by some electronic communication means such as a mobile phone or portable computer; comment on summaries; rate summaries; vote on summaries. In step 1540, a dedicated orchestration component can be utilized, facilitating communication of search results from the search engine to the AI Language Model, and linking the generated summary back to the search results. The orchestration layer is represented as orchestration module 1740 on FIG. 17.

FIG. 16 is a block diagram depicting an exemplary client/server system which may be used by an exemplary web-enabled/networked embodiment of the present invention.

A communication system 1600 may include a multiplicity of clients with a sampling of clients denoted as a client 1602 and a client 1604, a multiplicity of local networks with a sampling of networks denoted as a local network 1606 and a local network 1608, a global network 1610 and a multiplicity of servers with a sampling of servers denoted as a server 1612 and a server 1614.

Client 1602 may communicate bi-directionally with local network 1606 via a communication channel 1616. Client 1604 may communicate bi-directionally with local network 1608 via a communication channel 1618. Local network 1606 may communicate bi-directionally with global network 1610 via a communication channel 1620. Local network 1608 may communicate bi-directionally with global network 1610 via a communication channel 1622. Global network 1610 may communicate bi-directionally with server 1612 and server 1614 via a communication channel 1624. Server 1612 and server 1614 may communicate bi-directionally with each other via communication channel 1624. Furthermore, clients 1602, 1604, local networks 1606, 1608, global network 1610 and servers 1612, 1614 may each communicate bi-directionally with each other.

In one embodiment, global network 1610 may operate as the Internet. It will be understood by those skilled in the art that communication system 1600 may take many different forms. Non-limiting examples of forms for communication system 1600 include local area networks (LANs), wide area networks (WANs), wired telephone networks, wireless networks, or any other network supporting data communication between respective entities.

Clients 1602 and 1604 may take many different forms. Non-limiting examples of clients 1602 and 1604 include personal computers, personal digital assistants (PDAs), cellular phones and smartphones.

Client 1602 includes a CPU 1626, a pointing device 1628, a keyboard 1630, a microphone 1632, a printer 1634, a memory 1636, a mass memory storage 1638, a GUI 1640, a video camera 1642, an input/output interface 1644 and a network interface 1646.

CPU 1626, pointing device 1628, keyboard 1630, microphone 1632, printer 1634, memory 1636, mass memory storage 1638, GUI 1640, video camera 1642, input/output interface 1644 and network interface 1646 may communicate in a unidirectional manner or a bi-directional manner with each other via a communication channel 1648. Communication channel 1648 may be configured as a single communication channel or a multiplicity of communication channels.

CPU 1626 may be comprised of a single processor or multiple processors. CPU 1626 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors.

As is well known in the art, memory 1636 is used typically to transfer data and instructions to CPU 1626 in a bi-directional manner. Memory 1636, as discussed previously, may include any suitable computer-readable media, intended for data storage, such as those described above excluding any wired or wireless transmissions unless specifically noted. Mass memory storage 1638 may also be coupled bi-directionally to CPU 1626 and provides additional data storage capacity and may include any of the computer-readable media described above. Mass memory storage 1638 may be used to store programs, data and the like and is typically a secondary storage medium such as a hard disk. It will be appreciated that the information retained within mass memory storage 1638, may, in appropriate cases, be incorporated in standard fashion as part of memory 1636 as virtual memory.

CPU 1626 may be coupled to GUI 1640. GUI 1640 enables a user to view the operation of computer operating system and software. CPU 1626 may be coupled to pointing device 1628. Non-limiting examples of pointing device 1628 include computer mouse, trackball and touchpad. Pointing device 1628 enables a user with the capability to maneuver a computer cursor about the viewing area of GUI 1640 and select areas or features in the viewing area of GUI 1640. CPU 1626 may be coupled to keyboard 1630. Keyboard 1630 enables a user with the capability to input alphanumeric textual information to CPU 1626. CPU 1626 may be coupled to microphone 1632. Microphone 1632 enables audio produced by a user to be recorded, processed and communicated by CPU 1626. CPU 1626 may be connected to printer 1634. Printer 1634 enables a user with the capability to print information to a sheet of paper. CPU 1626 may be connected to video camera 1642. Video camera 1642 enables video produced or captured by user to be recorded, processed and communicated by CPU 1626.

CPU 1626 may also be coupled to input/output interface 1644 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1626 optionally may be coupled to network interface 1646 which enables communication with an external device such as a database or a computer or telecommunications or internet network using an external connection shown generally as communication channel 1616, which may be implemented as a hardwired or wireless communications link using suitable conventional technologies. With such a connection, CPU 1626 might receive information from the network, or might output information to a network in the course of performing the method steps described in the teachings of the present invention.

FIG. 17 illustrates a block diagram of an exemplary system for the interaction between a search engine and a multi-document summarization engine based on an AI Language Model, in accordance with an embodiment of the present invention.

In one embodiment of the present invention, AI-based search summary creation architecture 1700 may comprise a query module 1705, a datastore module 1720, a search module 1710, a summarization module 1715, Internet communication module 1735, AI language module 1730, and a display module 1725.

Referring to FIGS. 16 and 17, Query module 1705 may include a mechanism for receiving user inputs such as, without limitation, a client or computer terminal 1602, a keyboard 1630, a touchpad, a pointing device or mouse 1628, a voice input device or microphone 1632, a video camera 1644, or any device possessing computing capabilities such as, without limitation, a laptop, smartwatch, GOOGLE™ Glass, etc. Search module 1710 may have a processing means or engine 1626 such as, without limitation, a server 1632, a client or computer platform 1602, a smartphone device. Data store module 1720 may include one or more databases for storing, but not limited to, an AI Language Model that is built based on the Internet sources fed to it. The processing means or engine of search module 1710 may be connected to Internet communication module 1735 and the one or more databases which may contain an AI Language Model which is continuously retraining itself based on new sources fed into the model including but not limited to, entries and/or data relevant to any searches performed by search module 1710. In a neural network (NN), databases 1720 may comprise an AI Language Model which is continuously retraining itself based on new sources fed into it. Summarization module 1715 may include a multi-document summarization engine implemented via AI Language Module 1730 that may perform a multi-document summarization of the results using the AI Language model. AI Language Module 1730 may comprise AI language processing means including a server 1632, a client computer platform 1602, a smartphone device, etc. In some embodiment, the search engine and the summarization engine may be integrated as one system, so that both have direct access to the body of documents stored a database, data store or a file server and/or so that the summarization engine is calling the search engine, receiving back the documents to summarize. In other embodiments, Web page or a number of Web pages comprising a Web application may call the search engine, receive back the links to the documents, then passes the links to the summarization engine, receive back the summary, and display results to the user. In an alternative embodiment, the search engine is replaced with a Question-Answering system.

Data store module 1720 may include one or more data stores or databases. The processing means or search summarization engine of search summarization module 1715 may include, without limitation, server 1633, a client computer terminal 1602, and a mobile communication device which may process metadata associated with a user and/or any search results and create one or more search summaries. Search module 1710 and summarization module 1715 may be implemented as one component rather than two separate ones, in case of a neural-network based embodiment, where the model itself decides which text elements to include and how to combine them into a response using its proprietary rules. Display module 1725 has a display means such as, without limitation, computer terminal, a computer monitor, speakers, TV screen, virtual reality mechanisms, "smart" devices like GOOGLE™ Glass or smartwatch, etc. In some embodiments, an Internet browser plugin or add-on calls the search engine, receives the links to the documents back, then passes the links to the summarization engine, receives the summary back, and displays it to the user. In other embodiments, the Internet browser plugin or add-on screen-scrapes the results of a search on the Web page, then passes the links to the summarization engine, receives back the summary, and displays it to the user. In some embodiments, a Web service is used to call a Web application product that implements the invention, passing to the Web application product the links to documents; and the Web application product calls the summarization engine, receives the summary, and passes it back to the Web service; and the Web service returns the summary to its caller application to peruse in any desired fashion.

In some embodiment, referring to FIGS. 16 and 17, a computer program product installed on standalone computer 1602 or a LAN server 1612 calls the search engine via an API, receives back the links to the documents, then passes the links to the summarization engine, receives back the summary, and displays it to the user. In other embodiments, a computer program product installed on a mobile communications device calls a server application, passing a query from the user. The server application passes the query to the search engine, receives back the links to the documents, then passes the links to the summarization engine, receives back the summary, and returns it to the mobile device for display to the user. In an alternative embodiment, an application implementing the invention is a computer program product running on standalone computer 1602; and that program product performs a search on the local computer drives including memory 1636 and mass memory storage 1638; and summarizes the found search results on the same computer 1602.

Referring to FIGS. 16 and 17, in operation, a user may submit a search query to the Internet on a user input device such as computer terminal 1602. The search query may be sent to a search module 1710 which may include a server 1632 to process the search query. One or more databases 1720 with the AI Language Model are searched according to the search query sent to search module 1710. A set of search results may be created and may be compiled using the AI Language model. In some embodiments, in the case of a neural network, the system may attempt to process individual sources and text fragments, and the neural network learns through the process, becoming able to distinguish patterns in the text, and generate a meaningful answer to a user's query. In some cases, individual sources have been already pre-processed by the system; the system learns from the process; and is now able to return a summary looking as a coherent response. The quality of such summaries is high, close to summaries generated by humans.

The compiled search results may then be sent to summarization module 1715. Summarization module 1715 processing means such as, but not a limitation, server 1632, may create a summary of one or more search results in the form of AI Language Model response. The summaries created by summarization module 1715 may also factor in the metadata and/or search results created and compiled using the AI Language Model received from search module 1715 and create specialized summaries according to the metadata and/or search results created and compiled using the AI Language Model. The specialized summaries may be sent to display module 1725 for display to a user. Display module 1725 may receive user input from a user input device such as a client computer terminal 1602. User input may be used to control the summaries and/or any summary metadata displayed by display module 1725. Display module 1725 may format any summaries and/or summary metadata to accommodate virtually any means to relay information to a user such as, without limitation, hiding and/or highlighting sources, hiding and/or highlighting information, comparing multiple summaries, changing the font or any other formatting attributes of the summary, changing the language of the summary, including or excluding multimedia elements along with the text, amplifying or playing down multimedia elements, excluding duplicate or similar sentences or multimedia objects, or modify the sentences linguistically to make them read one after the other as a coherent text. Note that in case of a multi-document summarization system based on the AI Language Model, such refinement step is performed within multi-document summarization system 1715 by compiling coherent answer to the user's request.

Some embodiments of the present invention may be configured to combine a multi-document summarization engine with Internet search. Both concepts previously existed separately from each other. Further, currently webpages are generally served whole to the user, via a URL or page load, without an attempt to split the web pages into meaningful fragments and then create a summary of such fragments. Regarding the implementation of such embodiments, they may comprise means to build parsing of the source documents and ranking of individual fragments (using NLP or any other techniques) in such a way that combining fragments from different documents still reads like a coherent text.

Some search engines, like GOOGLE™, display a snippet of text corresponding to each search result. There is a one-to-one correspondence between the snippet and the page from which it originated. Unlike this method, at least some embodiments of the present invention may be implemented to describe multi-document summarization, where more than one text fragment may correspond to a source webpage. Such fragments may be interwoven into a joint summary of multiple webpages, in which the order of fragments sourced from the same webpage is not defined by each fragment's position within that webpage. A similar mechanism is employed in CHATGPT™ and similar systems, where a summary generated by the chatbot has links/references to the source webpages where the content originated from. As in embodiments of the present invention, a source in CHATGPT™ may be referenced more than once.

Typical methods of multi-document summarization may be implemented via a multitude of algorithms and may be based on different principles. Therefore in general, no two multi-document summaries may look alike. The fragments of text can be taken from different parts of a webpage; they can also be ranked differently by different multi-document summarization engines. Hence, the generated summary produced by different engines will be generally different. When implemented by embodiments of the present invention, the exact algorithm or principles of operation of a particular multi-document summarization engine are irrelevant, as long as the summary is produced out of fragments of text or media from multiple sources, whether extracted or generated, and the references to sources are available in the summary. For example, CHATGPT™ integrated with Microsoft Bing™ search engine generating a summary in response to the user's query, with references to search results, falls under an embodiment of the present invention. Regarding specifics of multi-document summarization implementation in such embodiments, it parses disparate documents, identifies key fragments and ranks them within the document, and then again ranks all fragments from all sources together, generally with a different ranking algorithm. This last ranking is actually focused on the coherence and quality of the summary. A special case that can be handled by at least some embodiments of the present invention is when only one document is available from which to create a summary for the user. Such embodiments may be able to summarize the single document and present it to the user as the response. If no sources are found to match the user's query, the system may respond in a variety of ways. For example, without limitation the system may provide an error or a default response or may suggest the user to tweak or expand the query based on the system's understanding of the user's intent, for example, by parsing the query linguistically and identifying related concepts to the ones found in the query.

Embodiments of the present invention may be implemented with the ability for the user to modify the set of sources and have the summary regenerated. The user may be shown a list of all sources used in the construction of the summary and unselect some of them. Then, the summary is regenerated based only on the sources that remained selected. Another aspect of some embodiments is the ability for the multi-document summarization engine to expose key concepts from the sources and allow the user to regenerate the summary according to the key concepts the user selects. The user may be shown a tag cloud of such concepts and click on the concept of interest to him. Then, the summary is automatically regenerated/refocused with the selected concepts gaining extra weight.

It should be noted that while many of the embodiments described in the present disclosure are set forth in terms of keyword and/or natural language search system, it should be understood that the principles for generating a resulting summary, combined with other techniques, may be applied by those skilled in the art to address general multi-document summarization applications, e.g., without limitation, other semantic or linguistic methods, or even a manual post-processing of the results. For example, a system built according to the principles of embodiments of the present invention may be integrated into an enterprise workflow, for example, without limitation, processing emails or documents. Such systems may also be integrated into a document repository system, improving the ability for document retrieval (i.e., searching for matching documents, then parsing them into meaningful fragments, then applying multi-document summarization to those fragments, and producing a summary of the whole repository to the user with links to key documents supporting the elements of the summary). Some embodiments may also be integrated with office automation tools like word processors or a presentation tool, or any other application, such as, without limitation, any productivity applications executing on a client system or in the cloud (e.g., MS OFFICE™, Adobe's™ various Apps, potentially linking the document/presentation into a summary constructed out of multiple documents whose key concepts match the ones in the document/presentation.

Systems described in accordance with embodiments of the present invention may benefit from self-learning capabilities, allowing them to improve the quality of produced summaries. For example, without limitation, the system may allow the user to rate a summary, whether in a simple Like/Don't like fashion, or using specific parameters to indicate what were the good or bad qualities of the summary (e.g., the coherence of the summary, saturation with useful content, breadth of coverage, etc). Also, such systems may explicitly suggest several summaries on the same topic for the user to choose from, such summaries generated based on different algorithmic parameters, including, but not limited to, ranking/weighting of text fragments. Based on the history of users selecting one or another type of summary, the systems may learn the preferences of the users and continue automatically tweaking the algorithm to produce higher-quality summaries. Another learning aspect may be applicable to multi-document summary engines built on top of neural networks where new content is continuously loaded into the neural network knowledge base, impacting statistical calculations, weights, and dictionaries that the neural network considers while producing a summary.

Systems built on the principles of embodiments of the present invention may also benefit from extracting semantic concepts from the sources and presenting them to the user alongside the summary as a tag cloud or a list. Semantic concepts describe meaningful content contained in a source. For example, if the user is asking for a summary on "causes of ocean tides", semantic concepts may be Moon, Ocean, Tide, Ebb, etc. Some of the semantic concepts exist in only a single source, whereas others may correspond to multiple sources. While the exact mechanism of identifying such concepts is not covered this disclosure, known semantic techniques such as, but not limited to, NLP methods, linguistic dictionaries, Ontological networks, and/or AI Language Models may be used for that. Returning semantic concepts as part of the summary allows the user to select the concept(s) that the user is interested in and regenerate the summary with an additional focus on the selected concept(s). Such concepts may then be given extra weight during the re-ranking process, and would pull corresponding text fragments to the top of the summary.

Another way for the user to interact with the system built on the principles of this invention is rating the summary. It may be done in many ways, for example as simple as indicating Good vs Bad, or choosing which of the multiple summaries returned is better than the others, or grading a summary on a set of parameters provided by the system e.g. the coherence of the summary, saturation with useful content, breadth of coverage, etc.

A number of current systems have been using linguistic dictionaries and various NLP techniques to perform text analysis. Some of the systems may perform a summarization of a single document or a webpage to identify key snippets of text or key semantic concepts. Embodiments of the present invention may rely on multi-document summarization, as opposed to a single-document summarization. Such multi-document summarization may rely on dictionaries, text parsing algorithms, algorithms for ranking key concepts or text fragments, etc. It should be understood that the present invention is agnostic as to the particular algorithm(s) of/or means for achieving multi-document summarization according to the present invention, which sets forth the integrating of multi-document summary into a search result of a search engine, or any other application, such as, without limitation, productivity applications executing on a client system or in the cloud, where the system receives a user natural language/keyword query and generates coherent summarized response(s) based on parts of one or more corresponding source documents.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that may be carried out on a computing machine, a typical computer system may, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention may or should be located locally and which may or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6).

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breathe life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserves its right to later amend the present application to explicitly include citations to such documents and/or explicitly include the functionally corresponding structures which were incorporated by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing metadata-based search summary creation according to the present invention will be apparent to those skilled in the art. Various aspects of the invention have been described above by way of illustration, and the specific embodiments disclosed are not intended to limit the invention to the particular forms disclosed. The particular implementation of the metadata-based search summary creation may vary depending upon the particular context or application. By way of example, and not limitation, the metadata-based search summary creation described in the foregoing were principally directed to online search engine implementations; however, similar techniques may instead be applied to big data applications, chatbots based on AI Language Model or any other principles, and non-Internet document content summarization, research tools, and database software, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A Graphical User Interface (GUI) comprising:
    an input field for receiving a query input(s), said query input(s), to include text prompts or tokens being communicated, along with pertinent control parameters, as inputs to a Language Model based system and/or a search engine system, wherein said Language Model based system includes generative artificial intelligence systems, whereby the Language Model based system computes pertinent content related to said query input(s), and generates a summarization of the pertinent information for displaying upon said GUI, wherein said pertinent information includes text fragments or text portions that are directly or statistically sourced from or associated with at least one documents and/or multiple portions of the same document;
    wherein said GUI receive said pertinent information, and displays, in a information summarization portion, said pertinent information summarization, said displayed summarization being at least in part derived from the Language Model based system, and configured to produce a displayed summary or narrative portion that summarizes results, to included said text fragments/portions, generated in response to the query, that generally reads as coherent natural language text to a human user, said summarization at least providing an overview of said pertinent information; and
    wherein based upon a GUI control action or setting, optionally displaying citation of pertinent document source(s) having information that is/are associated with said summary or said text fragment(s)/portion(s), the citations being configured to enable the user to locate and/or navigate to viewing the pertinent document source(s).

2. The Graphical User Interface (GUI) of claim 1 where an Internet browser plugin or add-on screen-scrapes the results of a search on a Web page, then passes the links to a summarization engine, receives back the summary, and presents the summary to the user.

3. The Graphical User Interface (GUI) of claim 1 where a Web service is used to call a Web application, passing to the Web application the links to documents, and said application calls a summarization engine, receives the summary, and passes it back to the Web service, and the Web service returns the summary to the caller application to peruse in any desired fashion.

4. The Graphical User Interface (GUI) of claim 1 where a computer software program product installed on a stand-alone computer or a LAN server calls the search engine system via an API, receives back the links to the documents, then passes the links to a summarization engine, receives back the summary, and presents the summary to the user.

5. The Graphical User Interface (GUI) of claim 1 where a computer software program installed on a client device calls a server application passing it a query from the user, the server application passes the query to a search engine, receives back the links to the documents, then passes the links to a summarization engine, receives back the summary, and returns it to the client device to present to the user.

6. The Graphical User Interface (GUI) of claim 1 where instead of the search engine system, at least one of a Question-Answering system and an Internet or Intranet Directory is used.

7. The Graphical User Interface (GUI) of claim 1, where a computer software program product running on a stand-alone computer performs a search on the computer drives and summarizes the found search results on the same computer.

8. A computer-based method or software program product for combining search and summarization, where a search is performed to get a list of documents, and the documents or links to those documents are passed to a summarization engine, the method comprising:

producing a multi-document summary of the documents as a result of the computer-based method or software program product executing the steps of, a) A search component:

searching, with a search engine, a plurality of documents and identifying documents matching a user's query, wherein search results include documents or files containing text, in any format, or in the form of fragments of text, and wherein the text includes a natural language structure and free-form, and wherein the documents include file format readable by the system, the language of the text is not specified and include human language, and the language of different documents the same or different, wherein search results comes from the Internet, an Intranet/enterprise network/Local Area Network (LAN), retrieved from a database or a computer file, or generated by a computer program based on a summarization algorithm;

b) A summarization component:

producing a summary of the search results identified by the search component;

performing a multi-document summarization of the search results, identifying the statistically relevant information associated with pertinent portion(s) of one or more source documents in the context of the query, and producing a text summary that is a natural language summarization of said identified statistically associated and relevant information;

wherein the summarization algorithm is based on Natural Language Processing, analyzing the text of the search results, identifying key semantic concepts and/or text fragments, and scoring them by relevance or other factors;

wherein the summarization algorithm considers document structure, document format, metatags, or any other type of data associated with the search results, to use while identifying and scoring key semantic concepts and/or text fragments;

the summary comprises semantically relevant concepts and/or text fragments, and, optionally, the position of a particular sentence on its source page is taken into account, where relevance is more important, wherein a search query may be passed to the system, the language of the query specified to the system, or may be automatically identified by the system;

analyzing the search query using NLP or metadata, in order to affect the calculation of relevance scores, focusing the summary on the topic specified by the query, if the system is unable to use the query, generating a summary of key semantic concepts in the documents, without focusing on a particular topic;

calculating a relevance score of each sentence or text fragment(s), wherein the score is displayed by the system to the user;

specifying the language of the documents to the summarization component, or automatically identified by it, the system processes one language, or a variety of languages, the system skips a document if it cannot understand its language;

limiting the summarization component, on the number of documents to process for a summary, wherein the limit may be passed to the system as a parameter or configured as a default;

c) A program component including a system core;

controlling an interaction between the search component and the summarization component;

receiving, by the system core, search results from the search components;

passing the specified number of those results (for example, top ten results) to the summarization component;

receiving back the summary; and passing the summary back to the user.

9. The method of claim 8, where the query is empty or is not passed to the summarization engine, and further comprising the step of instructing the summarization engine to produce a summary of results without a focus on a particular topic.

10. The method of claim 8, where the query is empty or is not passed to the system core, and further comprising the steps of instructing the system to derive a topic based on a predefined or built-in criteria, or based on additional parameters, and to produce a summary of results with a focus on that topic.

11. The method of claim 8 further comprising the steps of using dictionaries of words or phrases which are characteristic for a particular information domain, as well as those that are not characteristic, allowing the summarization engine to adjust its algorithm to better suit this particular domain, wherein the dictionaries are static, or dynamically populated by users or administrators, or accumulated by the system core through its learning features.

12. The method of claim 8, where clustering of semantic concepts are extracted from search results, and where concepts close to each other as perceived by the system, are clustered together, and a hierarchy of concepts and/or clusters are created by the system core.

13. The method of claim 8, where the summarization engine include self-learning capabilities, based on the rating of its results as communicated by users directly, or by way of feedback or by analyzing the user's usage of the search summary result, to include by way of calculating the time the user spent on reading it, or whether a subsequent query from the user shows that the user had received an answer to his/her query.

14. The GUI of claim 1 further comprising a clickable of selectable link for navigating to at least one source document related to at least a portion of the summary, akin to bibliographical reference, wherein said at least one source document at least reasonably supports the cited portion of the summary content, even if not being a directly quoted information source.

15. The method of claim 8, further comprising the steps of extracting semantic concepts, by the summarization engine, displaying the semantic concepts to the user, in a form of a list, or a cluster hierarchy, or a tag cloud, and presenting the concepts to refine the query, or to navigate to certain parts of the summary, or to modify or regroup the contents of the summary, by selecting or unselecting certain clusters or concepts, wherein the modify function is configured to enable the user to request a modified summary that is regenerated based upon the displayed source(s) selected by the user.

16. The method of claim 8, further comprising the steps of allowing the user to rate the summaries based on quality or satisfaction, or rate individual text fragments or concepts, or rate the documents returned by the search engine, where the rating is communicated back to the system, and used by the system for learning.

17. The method of claim 8, where a Web page or a number of Web pages comprising a Web application calls a search engine, receives back the links to the documents, then passes the links to the summarization engine, receives back the summary, and presents the summary to the user.

18. The method of claim 8 where instead of the search engine, at least one of a Question-Answering system and an Internet or Intranet Directory is used.

19. The Graphical User Interface (GUI) of claim 1, wherein based upon a GUI control action, input, and/or setting, optionally enabling the user to update or modify said displayed content summarization by way of reworking the query with adjusted query input(s) and/or refined pertinent control parameters, and/or a selection/deselection of information sources used.

20. A method, the method comprising the steps of:
receiving a query input(s) from an input field of a Graphical User Interface (GUI) or Display Module, said query input(s) being communicated, along with pertinent control parameters, as inputs to an AI Language Module and/or a Search Module, whereby the AI Language Module computes pertinent content related to said query input(s), and a Summarization Module generates a summarization of the pertinent content for presentation upon the Display Module or Graphical User Interface (GUI), the pertinent content being composed with at least one of text fragments and image summary and that are sourced from multiple documents and/or multiple portions of the same document, integrating a multi-document summary into an application, wherein the application is of the type that receives a user natural language/keyword query and generates coherent summarized response(s) based on parts of one or more corresponding source documents; and facilitating communication, with an Orchestration Module, of search results or the pertinent content being composed with at least one of text fragments and image summary and that are sourced from multiple documents and/or multiple portions of the same document, from the Search Module to the AI Language Module, and linking the generated summarization of pertinent content back to the search results.

21. A method comprising the steps of:
receiving, with a Graphical User Interface (GUI) input field, a query input(s), to include text prompts or tokens, said query input(s) being communicated, along with pertinent control parameters, as inputs to a Language Model based system and/or a search engine system, wherein said Language Model based system includes generative artificial intelligence system(s), whereby the Language Model based system computes pertinent information related to said query input(s), and generates a summarization of the pertinent information for presenting on a Graphical User Interface (GUI), wherein said pertinent information includes text fragments or text portions that are directly or statistically sourced from or associated with at least one document and/or multiple portions of the same document;

wherein said GUI receiving said pertinent information, and displaying, in an information summarization portion, said pertinent information summarization, said displayed summarization being at least in part derived from the Language Model based system, and configured to produce at least one of a summary and narrative portion that summarizes a topic or issue of the query, that generally reads as coherent natural language text to a human user, said summarization at least providing an overview of said pertinent information; and, wherein based upon a GUI control action or setting, optionally displaying citation of pertinent document source(s) having information that is/are most associated with said at least text fragment(s)/portion(s), the citations being configured to enable the user to locate and/or navigate to viewing the pertinent document source(s).

22. The method of claim 21, wherein the pertinent information is further comprised of a natural language summary of pertinent image(s) that are sourced from the multiple documents and/or multiple portions of the same document and presenting citation(s) of pertinent document source(s) having information that is/are associated with at least one of said text fragments and pertinent image(s).

23. A software program product stored in a non-transitory computer-readable storage medium, wherein the software program product instructs one or more processors to perform the following steps:
receiving a query input(s), said query input(s) being communicated, along with pertinent control parameters, as inputs to a Language Model based system and/or a search engine system, wherein said Language Model based system includes generative artificial intelligence system(s), whereby the Language Model system computes pertinent information related to said query input(s), and generates a summarization of the pertinent information for presenting on a Graphical User Interface (GUI), wherein said pertinent information includes text fragments or text portions that are directly or statistically sourced from or associated with at least one document and/or multiple portions of the same document; and, receiving said pertinent information and presenting, in a information summarization portion, said pertinent information summarization, said presented summarization being at least in part derived from the Language Model based system, and configured to produce a narrative portion that summarizes results, to include said text fragments/portions, generated in response to the query, that generally reads as coherent natural language text to a human user, said summarization at least providing an overview of said pertinent information.

\* \* \* \* \*